United States Patent
Park et al.

(10) Patent No.: US 10,530,625 B2
(45) Date of Patent: Jan. 7, 2020

(54) LOW PEAK-TO-AVERAGE POWER RATIO WAVEFORM DESIGN FOR FREQUENCY MULTIPLEXING OF MULTIPLE STREAMS

(71) Applicant: QUALCOMM Incorporated, San Diego, CA (US)

(72) Inventors: Seyong Park, San Diego, CA (US); Wei Zeng, Cupertino, CA (US); Peter Gaal, San Diego, CA (US); Hao Xu, Beijing (CN); Yi Huang, San Diego, CA (US); Renqiu Wang, San Diego, CA (US); Sony Akkarakaran, Poway, CA (US); Tao Luo, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/873,668

(22) Filed: Jan. 17, 2018

(65) Prior Publication Data

US 2018/0205586 A1    Jul. 19, 2018

Related U.S. Application Data

(60) Provisional application No. 62/448,363, filed on Jan. 19, 2017.

(51) Int. Cl.
*H04K 1/10* (2006.01)
*H04L 27/26* (2006.01)

(52) U.S. Cl.
CPC ........ *H04L 27/2621* (2013.01); *H04L 27/262* (2013.01); *H04L 27/2614* (2013.01);
(Continued)

(58) Field of Classification Search
CPC ............. H04L 27/2621; H04L 27/2614; H04L 27/2615; H04L 27/2618; H04L 27/262; H04L 27/2637
(Continued)

(56) References Cited

U.S. PATENT DOCUMENTS

| | | | | |
|---|---|---|---|---|
| 8,532,047 B2 * | 9/2013 | Nguyen | ................. | H04J 11/003 370/329 |
| 8,699,609 B2 * | 4/2014 | Sorrentino | ............ | H04L 5/0007 375/267 |
| 2009/0116574 A1 * | 5/2009 | Wang | .................. | H04L 27/2626 375/267 |
| 2009/0268790 A1 | 10/2009 | Josiam et al. | | |

(Continued)

FOREIGN PATENT DOCUMENTS

GB    2433397 A    6/2007

OTHER PUBLICATIONS

Ciochina C., et al., "An Analysis of OFDMA, Preceded OFDMA and SC-FDMA for the Uplink in Cellular Systems", In: "Multi-Carrier Spread Spectrum 2007 :Proceedings from the 6th International Workshop on Multi-Carrier Spread Spectrum, May 2007, Herrsching, Germany", Jan. 1, 2007, Springer, Netherlands, XP055462113, ISBN: 978-1-4020-6128-8, vol. 1, DOI: 10.1 007/ 978-1-4020-6129-5_3, pp. 25-36.
(Continued)

*Primary Examiner* — Helene E Tayong
(74) *Attorney, Agent, or Firm* — Holland & Hart LLP

(57) ABSTRACT

Methods, systems, and devices for wireless communication are described. A user equipment (UE) may be configured with a transmission stream processor used to maintain a lower peak-to-average power ratio (PAPR) for uplink transmissions. In some cases, a UE may map modulated symbols of different signals (or waveforms) to interleaved subsets of frequency resources, and this form of frequency division multiplexing (FDM) may increase the PAPR of an uplink transmission. To reduce the PAPR of uplink transmissions,
(Continued)

a transmission stream processor at the UE may support techniques for phase ramping modulated symbols in the time domain prior to mapping the symbols to the frequency resources. These techniques may help to ensure that the signals to be included in an uplink transmission are aligned in such a way that the PAPR of the uplink transmission is reduced.

29 Claims, 17 Drawing Sheets

(52) U.S. Cl.
CPC ...... *H04L 27/2615* (2013.01); *H04L 27/2618* (2013.01); *H04L 27/2636* (2013.01)

(58) Field of Classification Search
USPC .......................................... 375/260
See application file for complete search history.

(56) References Cited

U.S. PATENT DOCUMENTS

| | | | |
|---|---|---|---|
| 2010/0158139 A1* | 6/2010 | Mudulodu | H04L 27/2626 375/260 |
| 2010/0202559 A1* | 8/2010 | Luo | H04B 7/0678 375/295 |
| 2011/0103405 A1* | 5/2011 | Lipka | H04L 27/2636 370/480 |

OTHER PUBLICATIONS

International Search Report and Written Opinion—PCT/US2018/014272—ISA/EPO—dated Apr. 18, 2018.
Ciochina C., et al., "An Analysis of Three Multiple Access Techniques for the Uplink of Future Cellular Mobile Systems", European Transactions on Telecommunications, Wiley & Sons, Chichester, GB, Aug. 1, 2008, vol. 19, No. 5, XP001515646, ISSN: 1124-318X, DOI: 10.1002/ETT.1303, pp. 581-588.

* cited by examiner

LOW PEAK-TO-AVERAGE POWER RATIO WAVEFORM DESIGN FOR FREQUENCY MULTIPLEXING OF MULTIPLE STREAMS

CROSS REFERENCES

The present application for patent claims priority to U.S. Provisional Patent Application No. 62/448,363 by Park et al., entitled "Low Peak-To-Average Power Ratio Waveform Design For Frequency Multiplexing of Multiple Streams," filed Jan. 19, 2017, assigned to the assignee hereof, and which is hereby expressly incorporated by reference herein in its entirety.

BACKGROUND

The following relates generally to wireless communication and more specifically to time domain phase ramping for interlacing of multiple discrete Fourier transform (DFT) spread waveforms.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system).

A wireless multiple-access communications system may include a number of base stations or access network nodes, each simultaneously supporting communication for multiple communication devices, which may be otherwise known as user equipment (UE). A UE may identify multiple waveforms (e.g., data or reference signals) to transmit to a base station, and the UE may modulate the waveforms and map the modulated symbols to a set of frequency resources. In some cases, modulated symbols associated with each waveform may be interleaved over a set of frequency resources. However, interleaving modulated symbols associated with different waveforms may increase the peak-to-average power ratio of an uplink transmission, and this may be detrimental to communication in a wireless communications system.

SUMMARY

The described techniques relate to improved methods, systems, devices, or apparatuses that support time domain phase ramping for interlacing of multiple discrete Fourier transform (DFT) spread waveforms. A user equipment (UE) may be configured with a transmission stream processor used to maintain a lower peak-to-average power ratio (PAPR) for uplink transmissions. In some cases, a UE may map modulated symbols of different signals (or waveforms) to interleaved subsets of frequency resources, and this form of frequency division multiplexing (FDM) may increase the PAPR of an uplink transmission. In order to reduce the PAPR of uplink transmissions, a transmission stream processor at the UE may support techniques for phase ramping modulated symbols in the time domain prior to mapping the symbols to the frequency resources. These techniques may help to ensure that the signals to be included in an uplink transmission are aligned in such a way that the PAPR of the uplink transmission is reduced.

A method of wireless communication is described. The method may include identifying a first set of symbols modulated according to a first symbol constellation for a transmission in a symbol period, applying a phase ramp in the time domain to the first set of symbols to obtain a set of phase-ramped time domain symbols, where the first set of symbols may be modulated according to a first symbol constellation for a transmission in a symbol period, performing frequency domain spreading of the set of phase-ramped time domain symbols to obtain a first frequency domain signal, mapping the first frequency domain signal to a first subset of a set of subcarriers for the transmission and a second frequency domain signal to a second subset of the set of subcarriers, wherein the second frequency domain signal is based at least in part on a second set of symbols modulated according to a second symbol constellation, generating a time domain waveform for the transmission based on a frequency to time domain transform of the mapped first and second frequency domain signals to the set of subcarriers, and transmitting the time domain waveform to a receiver.

An apparatus for wireless communication is described. The apparatus may include means for identifying a first set of symbols modulated according to a first symbol constellation for a transmission in a symbol period, means for applying a phase ramp in the time domain to the first set of symbols to obtain a set of phase-ramped time domain symbols, where the first set of symbols may be modulated according to a first symbol constellation for a transmission in a symbol period, means for performing frequency domain spreading of the set of phase-ramped time domain symbols to obtain a first frequency domain signal, means for mapping the first frequency domain signal to a first subset of a set of subcarriers for the transmission and a second frequency domain signal to a second subset of the set of subcarriers, wherein the second frequency domain signal is based at least in part on a second set of symbols modulated according to a second symbol constellation, means for generating a time domain waveform for the transmission based on a frequency to time domain transform of the mapped first and second frequency domain signals to the set of subcarriers, and means for transmitting the time domain waveform to a receiver.

Another apparatus for wireless communication is described. The apparatus may include a processor, memory in electronic communication with the processor, and instructions stored in the memory. The instructions may be operable to cause the processor to identify a first set of symbols modulated according to a first symbol constellation for a transmission in a symbol period, apply a phase ramp in the time domain to the first set of symbols to obtain a set of phase-ramped time domain symbols, where the first set of symbols may be modulated according to a first symbol constellation for a transmission in a symbol period, perform frequency domain spreading of the set of phase-ramped time domain symbols to obtain a first frequency domain signal, map the first frequency domain signal to a first subset of a set of subcarriers for the transmission and a second frequency domain signal to a second subset of the set of subcarriers, wherein the second frequency domain signal is based at least in part on a second set of symbols modulated according to a second symbol constellation, generate a time domain waveform for the transmission based on a frequency to time domain transform of the mapped first and second frequency domain signals to the set of subcarriers, and transmit the time domain waveform to a receiver.

A non-transitory computer readable medium for wireless communication is described. The non-transitory computer-readable medium may include instructions operable to cause a processor to identify a first set of symbols modulated according to a first symbol constellation for a transmission in a symbol period, apply a phase ramp in the time domain to the first set of symbols to obtain a set of phase-ramped time domain symbols, where the first set of symbols may be modulated according to a first symbol constellation for a transmission in a symbol period, perform frequency domain spreading of the set of phase-ramped time domain symbols to obtain a first frequency domain signal, map the first frequency domain signal to a first subset of a set of subcarriers for the transmission and a second frequency domain signal to a second subset of the set of subcarriers, wherein the second frequency domain signal is based at least in part on a second set of symbols modulated according to a second symbol constellation, generate a time domain waveform for the transmission based on a frequency to time domain transform of the mapped first and second frequency domain signals to the set of subcarriers, and transmit the time domain waveform to a receiver.

In some examples of the method, apparatus, and non-transitory computer-readable medium described above, the second symbol constellation may be different from the first symbol constellation. In some examples of the method, apparatus, and non-transitory computer-readable medium described above, the second symbol constellation corresponds to the first symbol constellation with a symbol rotation. In some examples of the method, apparatus, and non-transitory computer-readable medium described above, the symbol rotation may be based on a modulation order of the first symbol constellation. In some examples of the method, apparatus, and non-transitory computer-readable medium described above, the second symbol constellation may have a different modulation order than the first symbol constellation.

In some examples of the method, apparatus, and non-transitory computer-readable medium described above, the first symbol constellation and the second symbol constellation may be a same symbol constellation. In some examples of the method, apparatus, and non-transitory computer-readable medium described above, the phase ramp for the first set of symbols may be based at least in part on respective subcarrier mapping indexes for the mapping of the first frequency domain signal. In some examples of the method, apparatus, and non-transitory computer-readable medium described above, the phase ramp for the first set of symbols may be based at least in part on a spreading length of the frequency domain spreading. In some examples of the method, apparatus, and non-transitory computer-readable medium described above, the phase ramp for the first set of symbols may be based at least in part on a size of the frequency to time domain transform.

Some examples of the method, apparatus, and non-transitory computer-readable medium described above may further include processes, features, means, or instructions for applying a second phase ramp in the time domain to the second set of symbols. Some examples of the method, apparatus, and non-transitory computer-readable medium described above may further include processes, features, means, or instructions for performing frequency domain spreading of the phase-ramped second set of symbols to obtain the second frequency domain signal. In some examples of the method, apparatus, and non-transitory computer-readable medium described above, the mapping comprises mapping a third frequency domain signal to a third subset of the set of subcarriers, and wherein the third frequency domain signal may be based at least in part on a third set of symbols modulated according to a third symbol constellation.

Some examples of the method, apparatus, and non-transitory computer-readable medium described above may further include processes, features, means, or instructions for applying a third phase ramp in the time domain to the third set of symbols. Some examples of the method, apparatus, and non-transitory computer-readable medium described above may further include processes, features, means, or instructions for performing frequency domain spreading of the phase-ramped third set of symbols to obtain the third frequency domain signal. In some examples of the method, apparatus, and non-transitory computer-readable medium described above, the first subset and the second subset of the set of subcarriers comprise interleaved subsets of the set of subcarriers.

In some examples of the method, apparatus, and non-transitory computer-readable medium described above, each symbol within the first symbol constellation may have a corresponding symbol in the second symbol constellation, and wherein a translation from the each symbol to the corresponding symbol does not cross a null symbol energy level. In some examples of the method, apparatus, and non-transitory computer-readable medium described above, the first symbol constellation may be a binary phase shift keyed constellation, a quadrature phase shift keyed constellation, or a quadrature amplitude modulation constellation. In some examples of the method, apparatus, and non-transitory computer-readable medium described above, the first set of symbols comprise a first type of information and the second set of symbols comprise a second, different type of information. In some examples of the method, apparatus, and non-transitory computer-readable medium described above, the second frequency domain signal comprises a frequency domain reference signal sequence.

DETAILED DESCRIPTION

Figure 1:
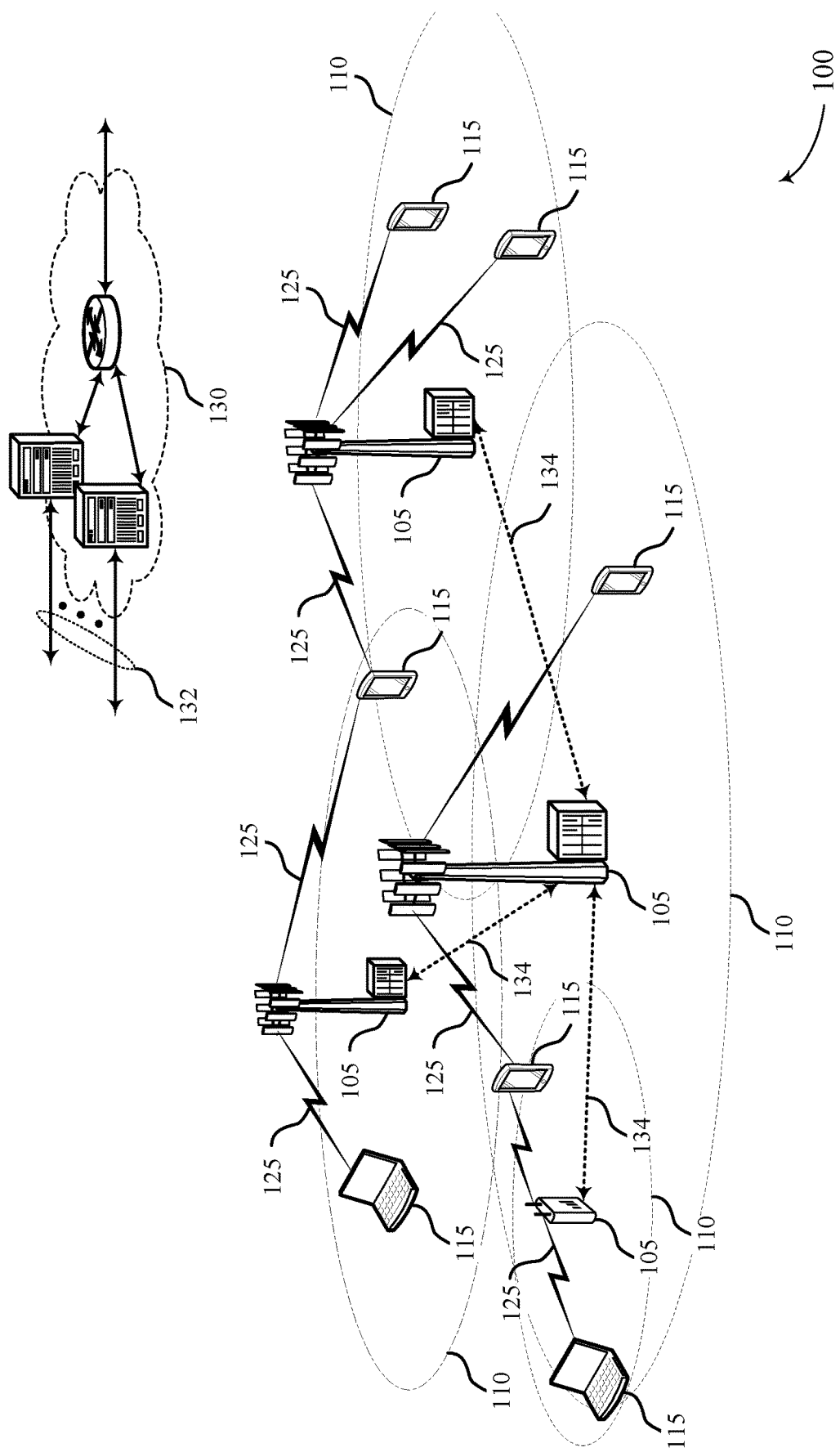
FIG. 1 illustrates an example of a wireless communications system that supports time domain phase ramping for interlacing of multiple discrete Fourier transform (DFT) spread waveforms in accordance with various aspects of the present disclosure.

A wireless communications system may support communication between a base station and a user equipment (UE). Specifically, a wireless communications system may support downlink transmissions from a base station to a UE and uplink transmissions from a UE to a base station. Uplink transmissions from a UE to a base station may include data, control signals, reference signals (e.g., demodulation reference signals (DMRSs), etc., and different streams may be multiplexed over a set of frequency resources (i.e., frequency division multiplexing (FDM)) for an uplink transmission. In some cases, the different waveforms may be mapped to interleaved subsets of the set of resources, and the subcarrier indices occupied by a specific waveform may be offset (e.g., one stream may be mapped to subcarriers 4, 7, 10, etc.). In such cases, the peak-to-average power ratio of the uplink transmission may be high, and this may result in reduced throughput in a wireless communications system.

Some UEs may support efficient techniques for reducing the peak-to-average power ratio (PAPR) of an uplink transmission to a base station. A UE may identify multiple streams associated with different signals (e.g., data, control, or reference signals) for an uplink transmission to a base station, and the UE may modulate the streams based on one or more modulation schemes (e.g., indicated by the base station in a control message). Subsequently, the UE may apply a time domain phase ramp to at least one of the sets of modulated symbols. The UE may then transform the time domain modulated symbols for the streams to the frequency domain using a discrete Fourier transform (DFT) (e.g., DFT spreading). Alternatively, at least one stream may be a set of symbols in the frequency domain that already have a low PAPR property (e.g., a reference signal sequence, such as a DMRS sequence). The UE may then map the modulated symbols to a set of frequency resources, and transform the frequency domain symbols back to the time domain using an inverse DFT (IDFT). The time domain phase ramp applied to the modulated symbols of a specific signal may depend on the amount of the DFT spreading. Afterwards, the UE may perform additional processes to prepare the signals for transmission to the base station. The time delay introduced by the time domain phase ramp may help to reduce the PAPR of the uplink transmission, thus resulting in more efficient communication. The techniques for uplink transmission described herein may be used for other transmissions such as UE-to-UE direct communication (e.g., sidelink communications, etc.), or other types of transmissions where a low PAPR may be desired.

Aspects of the disclosure introduced above are further described below with reference to a wireless communications system. These and other features are further illustrated by and then described with reference to apparatus diagrams and system diagrams that relate to supporting time domain phase ramping for interlacing of multiple DFT spread waveforms.

FIG. 1 illustrates an example of a wireless communications system 100 that supports time domain phase ramping for interlacing of multiple DFT spread waveforms in accordance with various aspects of the present disclosure. The wireless communications system 100 includes base stations 105, UEs 115, and a core network 130. In some examples, the wireless communications system 100 may be a Long Term Evolution (LTE) (or LTE-Advanced (LTE-A)) network, or a New Radio (NR) network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in the wireless communications system 100 may include uplink transmissions from a UE 115 to a base station 105, or downlink transmissions, from a base station 105 to a UE 115. Control information may be multiplexed on an uplink channel (e.g., physical uplink control channel (PUCCH)) or downlink channel (e.g., physical downlink control channel (PDCCH)) according to various techniques. Similarly, data may be multiplexed on an uplink channel (e.g., physical uplink shared channel (PUSCH)) or downlink channel (e.g., physical downlink shared channel (PDSCH)) according to various techniques. Control information and data may be multiplexed on a downlink channel, for example, using time division multiplexing (TDM) techniques, FDM techniques, or hybrid TDM-FDM techniques.

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

The core network 130 may provide user authentication, access authorization, tracking, Internet Protocol (IP) connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

A frame structure may be used to organize physical resources used for communication between a base station 105 and a UE 115. A frame may be a 10 ms interval that may be further divided into 10 equally sized sub-frames. Each sub-frame may include two consecutive time slots. Each slot may include 6 or 7 OFDMA symbol periods. A resource element consists of one symbol period and one subcarrier (a 15 KHz frequency range). A resource block may contain 12 consecutive subcarriers in the frequency domain and, for a normal cyclic prefix in each orthogonal frequency-division multiplexing (OFDM) symbol, 7 consecutive OFDM symbols in the time domain (1 slot), or 84 resource elements. Some resource elements may include downlink reference signals (DL-RS). The DL-RS may include a cell-specific reference signal (CRS) and a UE-specific RS (UE-RS). UE-RS may be transmitted on the resource blocks associated with PDSCH. The number of bits carried by each resource element may depend on the modulation scheme (the configuration of symbols that may be selected during each symbol period). Thus, the more resource blocks that a UE receives and the higher the modulation scheme, the higher the data rate may be.

In some cases, a base station 105 or UE 115 may modulate a digital signal by modifying the properties of a periodic waveform (e.g., frequency, amplitude and phase) prior to transmitting to a receiving device. A modulated waveform may be divided into time units known as symbols. Each symbol may be modulated separately. In a wireless communications system that uses narrow frequency subcarriers to transmit distinct symbols, the modulation is accomplished by varying the phase and amplitude of each symbol. For example, a binary phase shift keying (BPSK) modulation scheme conveys information by alternating between waveforms that are transmitted with no phase offset or with a 180° offset (i.e., each symbol conveys a single bit of information). In a quadrature amplitude modulation (QAM) scheme, two carrier signals (known as the in-phase component, I, and the quadrature component, Q) may be transmitted with a phase offset of 90°, and each signal may be transmitted with specific amplitude selected from a finite set. The number of amplitude bins determines the number of bits that are conveyed by each symbol. For example, in a 16 QAM scheme, each carrier signal may have one of four amplitudes (e.g., −3, −1, 1, 3), which results in 16 possible combinations (i.e., 4 bits). The various possible combinations may be represented in a graph known as a constellation map, where the amplitude of the I component is represented on the horizontal axis and the Q component is represented on the vertical axis.

Elements of wireless communications system 100 (e.g., UE 115 and base station 105) may utilize digital signal processors (DSPs) implementing Fourier transforms. A DFT may transform discrete time data sets into a discrete frequency representation. The discrete frequency representation may be used to map information to subcarriers in the frequency domain. Further, an IDFT may be used to transform a discrete frequency representation (e.g., information represented in subcarriers) into a discrete time representation (e.g., a signal carrying information in the time domain). For example, a transmitter may perform a DFT to map information to subcarriers, and subsequently perform an IDFT to transform the information contained in subcarriers into a signal varying in time to convey the original information.

In some cases, a UE 115 may identify information to transmit to a base station 105 in an uplink transmission. Specifically, a UE 115 may identify a set of signals (e.g., data signals associated with different data streams or data types, control signals, reference signals) to transmit to a base station 105. Prior to transmitting the signals, the UE may process the signals using a transmission stream processor that is used to, for example, modulate, map, and multiplex the signals on a set of resources. Different waveforms associated with different signals may be multiplexed over a set of frequency resources (i.e., FDM) for an uplink transmission. In some cases, the different waveforms may be mapped to interleaved subsets of the set of resources, and the subcarrier indices occupied by frequency domain information for a specific stream may be offset (e.g., subcarrier 4, 7, 10). In such cases, the PAPR of the uplink transmission may be high, and a transmitter at the UE 115 may not be able to correctly transmit the uplink transmission with the high PAPR. As a result, a base station 105 may not be able to decode the signals of the uplink transmission, and this may result in reduced throughput in a wireless communications system.

Some UEs may support efficient techniques for reducing the PAPR of an uplink transmission to a base station. A UE may identify multiple waveforms associated with different signals (e.g., data, control, or reference signals) for an uplink transmission to a base station, and the UE may modulate the signals based on a modulation scheme indicated by the base station in a control message. Subsequently, the UE may apply a time domain phase ramp to the modulated symbols to induce a time delay. The UE may then transform the time domain modulated symbols to the frequency domain using a DFT (e.g., DFT spreading), map the modulated symbols to a set of frequency resources, and transform the frequency domain symbols back to the time domain using an IDFT. The time domain phase ramp applied to the modulated symbols of a specific signal may depend on the amount of the DFT spreading. Afterwards, the UE may perform additional processes to prepare the signals for transmission to the base station. The time delay introduced by the time domain phase ramp may help to reduce the PAPR of the uplink transmission, thus resulting in more efficient communication.

Figure 2:
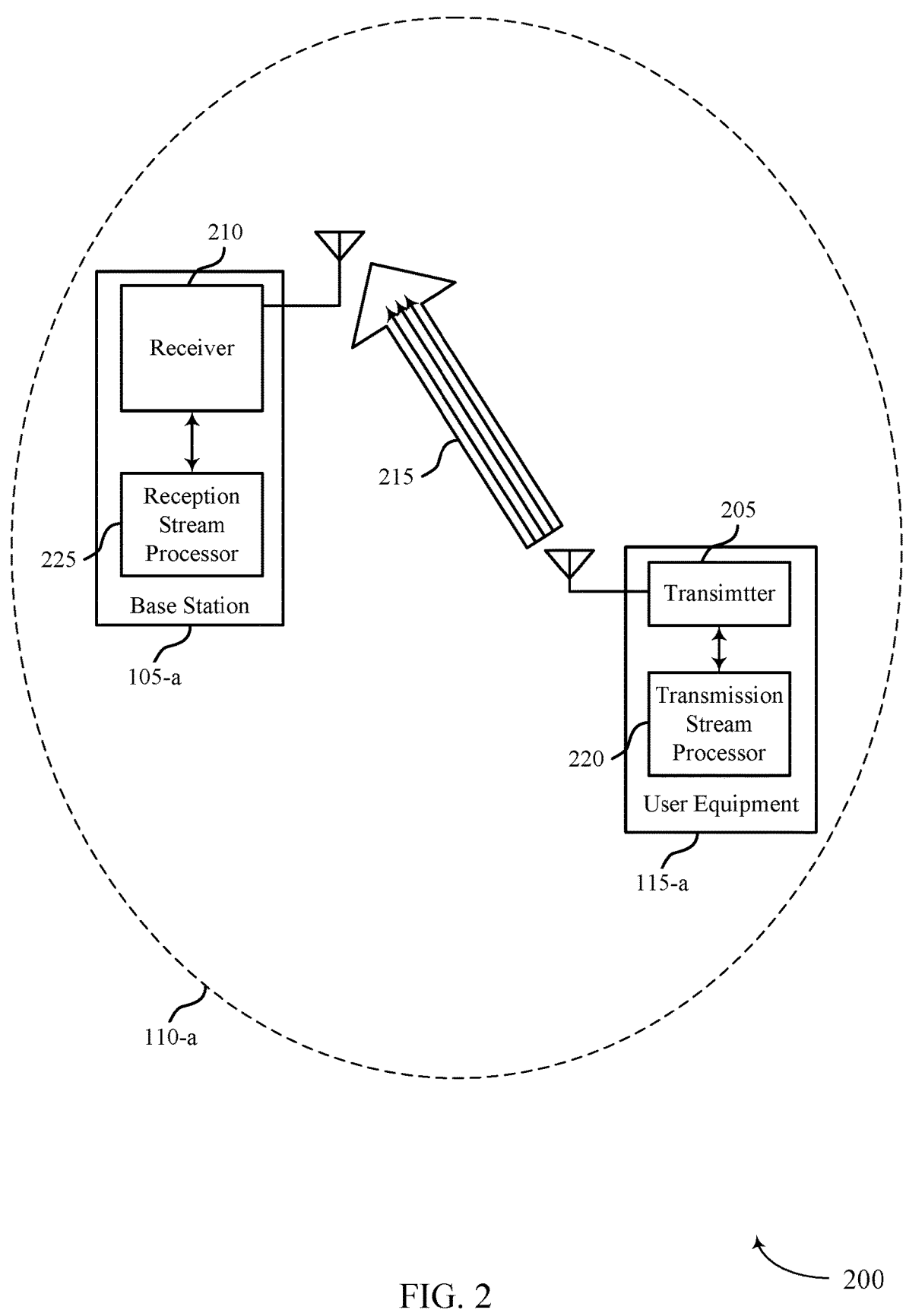
FIG. 2 illustrates an example of a wireless communications system that supports time domain phase ramping for interlacing of multiple DFT spread waveforms in accordance with various aspects of the present disclosure.

FIG. 2 illustrates an example of a wireless communications system 200 that supports time domain phase ramping for interlacing of multiple DFT spread waveforms in accordance with various aspects of the present disclosure. Wireless communications system 200 includes base station 105-a, which may be an example of a base station 105 as described with reference to FIG. 1. Wireless communications system also includes UE 115-a, which may be an example of a UE 115 as described with reference to FIG. 1. UE 115-a may be configured with a transmitter 205 used to transmit signals prior to base station 105-a, and base station 105-a may be configured with a receiver 210 used to receive signals from UE 115-a. The transmitter 205 may communicate with a transmission stream processor 220 to process uplink signals prior to transmission. The receiver 210 may communicate with a reception stream processor 225 to process received uplink signals after reception.

In some cases, UE 115-a may identify information for an uplink transmission 215 to base station 105-a. For example, UE 115-a may identify three (3) uplink information streams to transmit to base station 105-a, where the uplink information streams may include, for example, data, control information, or reference signal information (e.g., DMRS information). As described with reference to FIG. 3, a mapper at UE 115-*a* may map the different streams to different subsets of a set of frequency resources. For example, the UE 115-*a* may interleave the streams such that the tones associated with a single stream are offset from each other by at least two (2) tones (e.g., a first stream mapped to tones 0, 2, and 4, a second stream mapped to tones 1, 3, and 5). Additionally, a UE 115-*a* may interleave more than two streams, in which case the tones associated with each stream may be offset from each other by a number of tones determined by the number of streams.

However, multiplexing or mapping different streams to interleaved frequency resources (e.g., as described with reference to FIG. 3) may result in an increased PAPR associated with an uplink transmission (i.e., the probability of a higher PAPR is increased). In some cases, however, due to cost constraints, transmitter 205 may have transmission limitations regarding PAPR of transmitted signals. As such, uplink transmissions having PAPR above a threshold may be distorted and it may be difficult for receiver 210 to process and decode the streams of the uplink transmission 215. This may result in, for example, a relatively higher block error rate (BLER), etc. Wireless communications system 200 may support efficient techniques to reduce the PAPR associated with uplink transmission 215. Specifically, UE 115-*a* may support additional techniques to align signals in a symbol period mapped to multiplexed frequency resources for an uplink transmission so that the PAPR of the uplink transmission is reduced.

Figure 3:
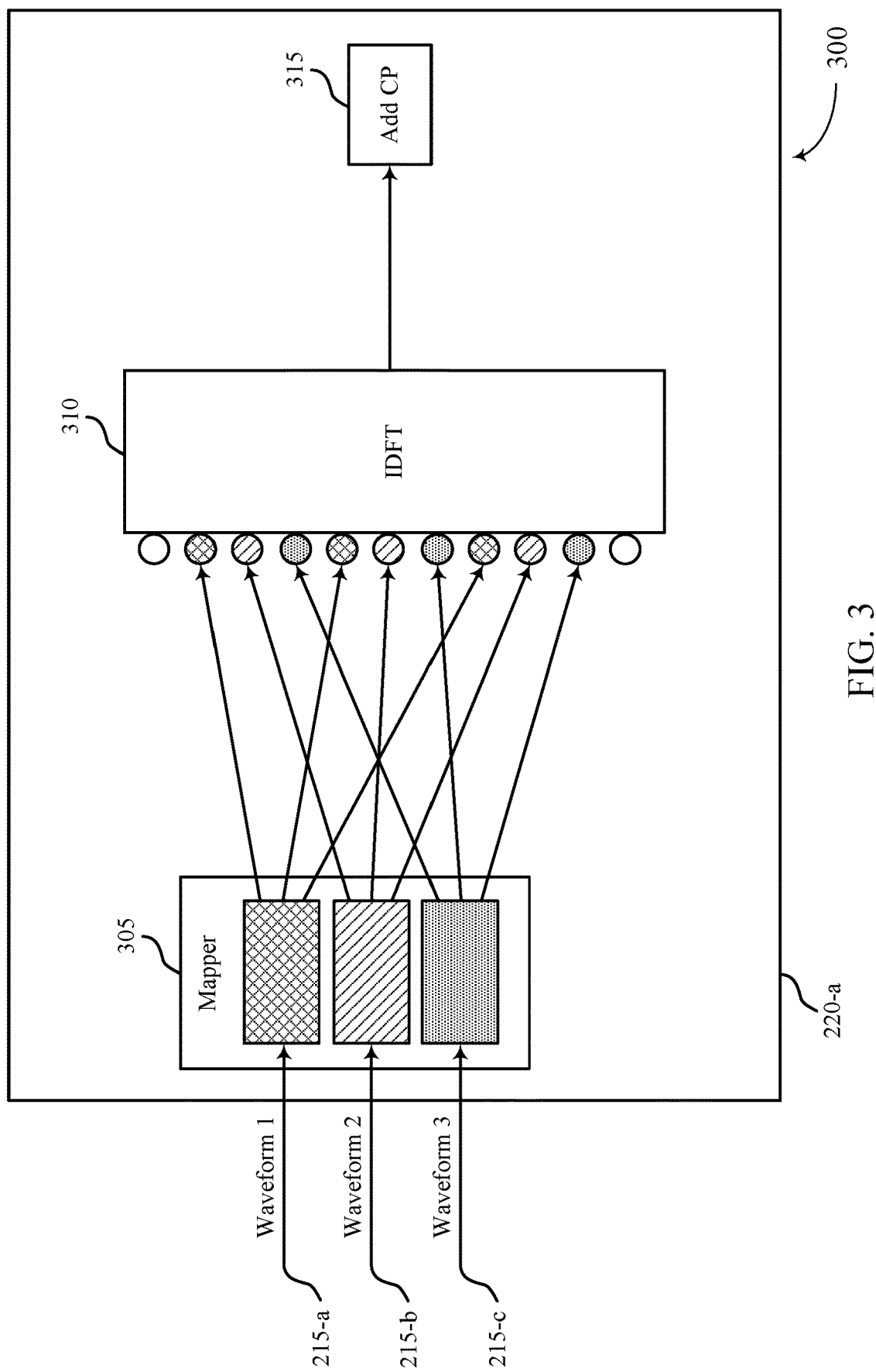
FIGS. 3 through 8 illustrate example diagrams of transmission stream processors that support time domain phase ramping for interlacing of multiple DFT spread waveforms in accordance with various aspects of the present disclosure.

FIG. 3 illustrates an example diagram 300 of a transmission stream processor 220-*a* that supports time domain phase ramping for interlacing of multiple DFT spread waveforms in accordance with various aspects of the present disclosure. In some examples, transmission stream processor 220-*a* may be an example of a transmission stream processor 220 of a UE 115 as described with reference to FIG. 2. Transmission stream processor 220-*a* may include a mapper 305, inverse Fourier transform component 310, and a cyclic prefix component 315. These components may be used to process signals 215 for an uplink transmission from a UE 115.

In some cases, signals 215-*a*, 215-*b*, and 215-*c* may each be frequency domain signals associated with low PAPR waveforms. Mapper 305 may map these signals to interleaved frequency resources, and IDFT component 310 may transform the signals 215 from the frequency domain to the time domain. Once transformed, cyclic prefix component 315 may append a cyclic prefix to the time domain signals. Subsequently, the signals may be further processed and transmitted over a set of resources allocated for the uplink transmission (e.g., via a transmitter 205). However, due to the mapping of the modulated symbols associated with different signals to interleaved frequency resources, the PAPR associated with the uplink transmission may be high, even though the PAPR of the individual signals, if transmitted independently, may be low. Accordingly, the uplink transmission from the UE 115 may be distorted, and a receiver (e.g., at a base station) may not be able to correctly decode the signals 215. In some examples, transmission stream processor 220-*a* may support efficient techniques for reducing the PAPR associated with an uplink transmission that includes uplink signals mapped to interleaved subsets of a set of frequency resources.

Figure 4:
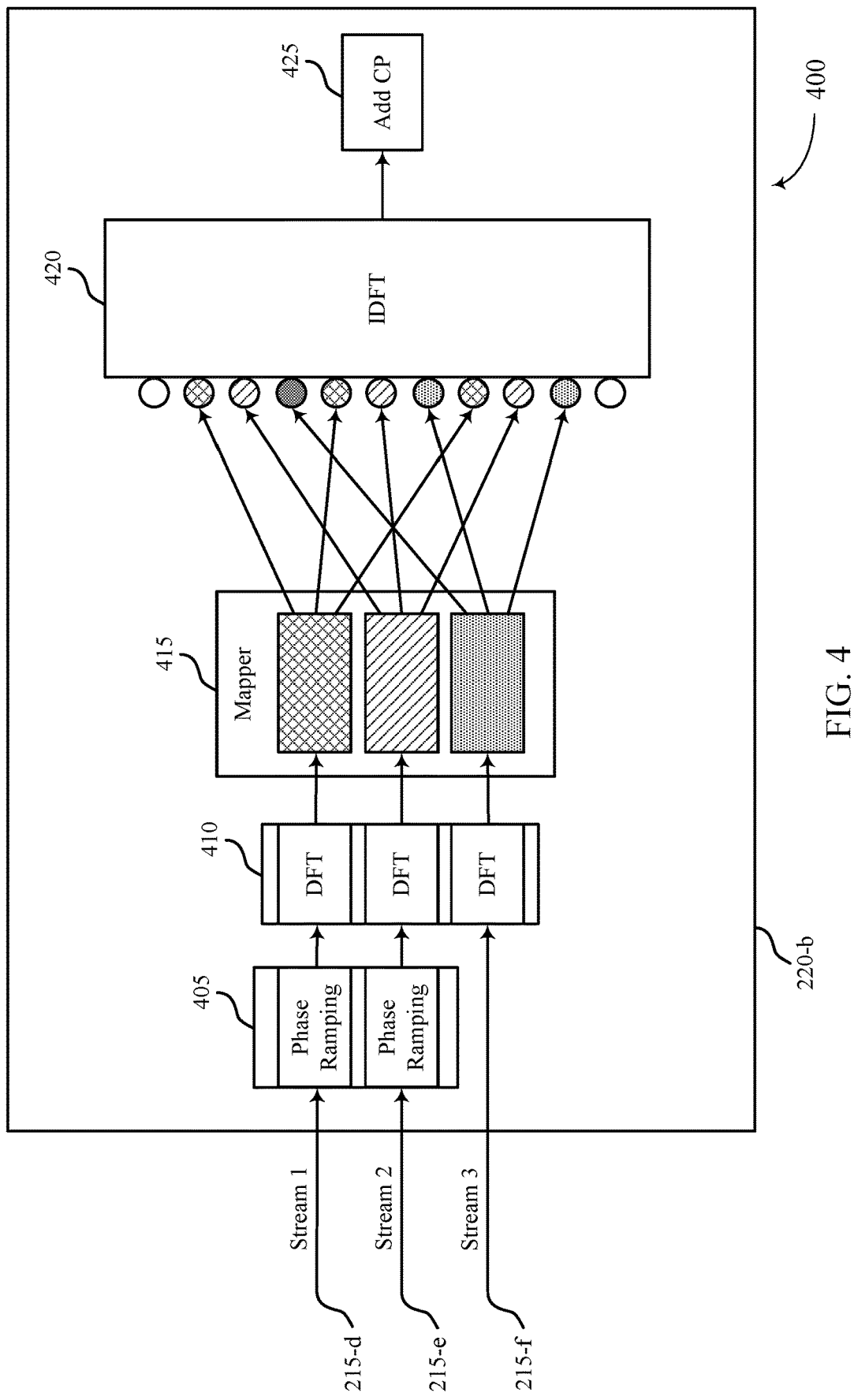

FIG. 4 illustrates an example diagram 400 of a transmission stream processor 220-*b* that supports time domain phase ramping for interlacing of multiple DFT spread waveforms in accordance with various aspects of the present disclosure. In some examples, transmission stream processor 220-*b* may be an example of a transmission stream processor 220 of a UE 115 as described with reference to FIG. 2. Transmission stream processor 220-*b* may include a phase ramper 405, Fourier transformer 410, mapper 415, inverse Fourier transformer 420, and a cyclic prefix adder 425. These components may be used to process signals 215 for an uplink transmission from a UE 115

As described with reference to FIGS. 1 through 3, the mapping of modulated symbols associated with different streams to frequency multiplexed subsets of a set of frequency resources may increase the PAPR of an uplink transmission. This is a result of a frequency domain offset between tones of a given stream. Transmission stream processor 220-*b* may support efficient techniques for compensating for the frequency domain offset. Specifically, transmission stream processor 220-*a* may include a phase ramper 405 that introduces a phase ramp in the time domain to compensate for the frequency domain offset. That is, prior to transforming at least one of the streams to the frequency domain, the transmission stream processor 220-*b* may introduce a phase ramp in the time domain.

The phase ramp may be determined based on the tone offset associated with the tones to be mapped to a specific signal. For example, first waveform 215-*d* may be mapped to tones k+2, k+5, k+8, etc. and, as a result, first waveform 215-*d* may be phase ramped based on the tone offset of 2. Similarly, second waveform 215-*e* may be mapped to tones k+1, k+4, k+7, etc. and, as a result, second waveform 215-*e* may be phase ramped based on the tone offset of 1. Finally, third waveform 215-*f* may be mapped to tones k, k+3, k+6, etc., and, as a result, third waveform 215-*f* may not be phase ramped based on a tone offset. The phase ramp for a given time domain symbol may also depend on a time index associated with the symbol (e.g., within a DFT spreading block, etc.). For example, each symbol for a given stream may be phase ramped according to the tone offset of the stream (e.g., 0, 1, 2, etc.) and the time index for the symbol within the DFT block.

Thus, for multiplexing of a given number of waveforms 215, some waveforms may be phase ramped while other waveforms are not phase ramped, or all waveforms may be phase ramped. By using this time domain phase ramping technique, after the symbols of the stream are converted to the frequency domain (e.g., by Fourier transformer 410) and back to the time domain (e.g., by inverse Fourier transformer 420), the signals may have a known alignment that reduces the PAPR of the uplink transmission.

Figure 5:
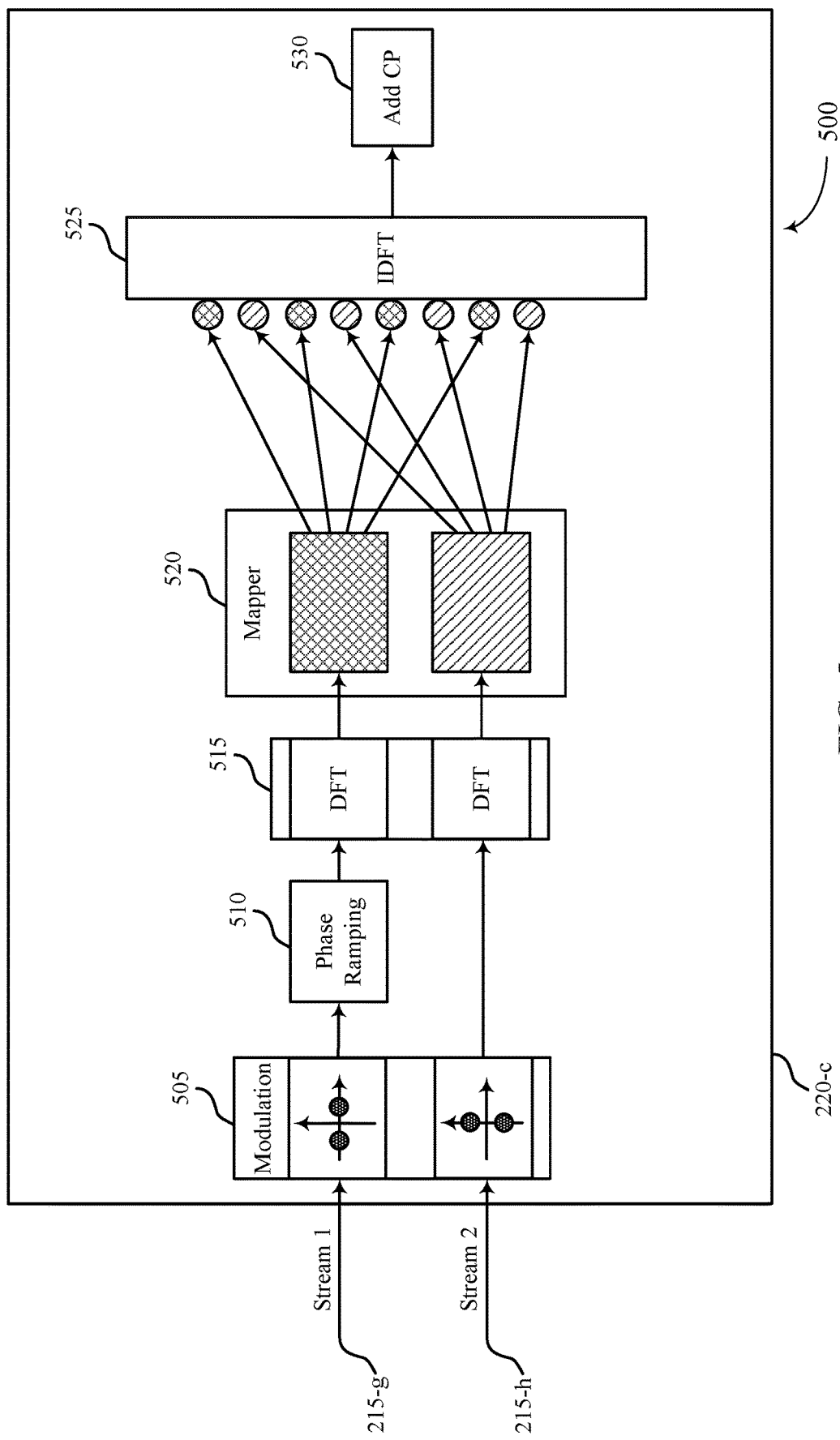

FIG. 5 illustrates an example diagram 500 of a transmission stream processor 220-*c* that supports time domain phase ramping for interlacing of multiple DFT spread waveforms in accordance with various aspects of the present disclosure. In some examples, transmission stream processor 220-*c* may be an example of a transmission stream processor 220 of a UE 115 as described with reference to FIG. 2. Transmission stream processor 220-*c* may include a modulator 505, phase ramper 510, Fourier transformer 515, mapper 520, inverse Fourier transformer 525, and a cyclic prefix adder 530. These components may be used to process bit streams 215 for an uplink transmission from a UE 115.

As described with reference to FIGS. 1 through 3, the mapping of modulated symbols associated with different signals to interleaved subsets of a set of frequency resources may increase the PAPR of an uplink transmission. This may be due to the phase ramp introduced by the frequency domain offset between tones of a specific signal. Transmission stream processor 220-c may support efficient techniques for compensating for the phase ramp introduced by the frequency domain offset. Specifically, transmission stream processor 220-c may include a phase ramper 510 that introduces a phase ramp in the time domain to compensate for the frequency domain offset.

In some cases, UE 115 may identify a first bit stream 215-g and a second bit stream 215-h for transmission in an uplink transmission (e.g., in a given symbol period of the uplink transmission). In this example, modulator 505 modulates the first bit stream 215-g according to a BPSK modulation scheme, and modulator 505 modulates the second bit stream 215-h according to a rotated BPSK modulation scheme. Phase ramper 510 then phase ramps the modulated symbols of the first bit stream 215-g in the time domain. That is, prior to transforming the signals to the frequency domain, the transmission stream processor 220-c may introduce a phase ramp in the time domain. By applying a phase ramp to modulated symbols of the first bit stream in combination with using different modulation schemes for the different waveforms, transmission stream processor 220-c may produce signals that have a known alignment in the time domain after further processing, such that the PAPR of the final uplink transmission is reduced. For reference signal sequences with a low inherent PAPR (e.g., when mapped directly in the frequency domain), the transmission stream processor 220-c may convert the signal to the time domain (e.g., via an IDFT) prior to performing the phase ramp, in order to maintain the low PAPR property of the signal.

The phase ramp may be determined based on various equations to reduce the PAPR of an uplink transmission. For example, the phase ramp may be calculated based on the following equation:

$$\text{Phase Ramp} = e^{\wedge}\left(\frac{-j*2*\pi}{2*(DFT\ \text{size})} *\text{tone offset}*\text{time index}\right) \quad (1)$$

where DFT size corresponds to the size of the DFT spreading, the tone offset corresponds to the offset between the tones of a waveform and a reference (e.g., non-offset) waveform as discussed above, and the time index is the time index within the block being input into the Fourier transformer 515. In some cases, the time index may not be used in the above equation (i.e., time index=1).

In the example of FIG. 5, the different waveforms are modulated according to a BPSK modulation scheme and a rotated BPSK modulation scheme. However, in other examples, the different waveforms may be modulated according to different modulation schemes. In some cases, the condition for applying the above techniques to signals modulated according to different modulation schemes may be that there may be no zero crossing between modulated symbols of different waveforms (e.g., no null symbol energy level crossings between corresponding symbols of the different modulation schemes). That is, if the modulated symbols of the first bit stream 215 are superimposed over the modulated symbols of the second bit stream 215, each modulated symbol of the first bit stream may share the same quadrant as a modulated symbol of the second bit stream.

Although FIG. 5 illustrates an example including two (2) streams, it should be understood that the techniques described herein also apply to processing more than two (2) streams for an uplink transmission. In some cases, the phase rotation of the modulation schemes for the streams may depend on the number of streams and the modulation orders of the streams. For example, three streams using BPSK modulation schemes may be rotated by 0, pi/3, and 2*pi/3, respectively.

Figure 6:
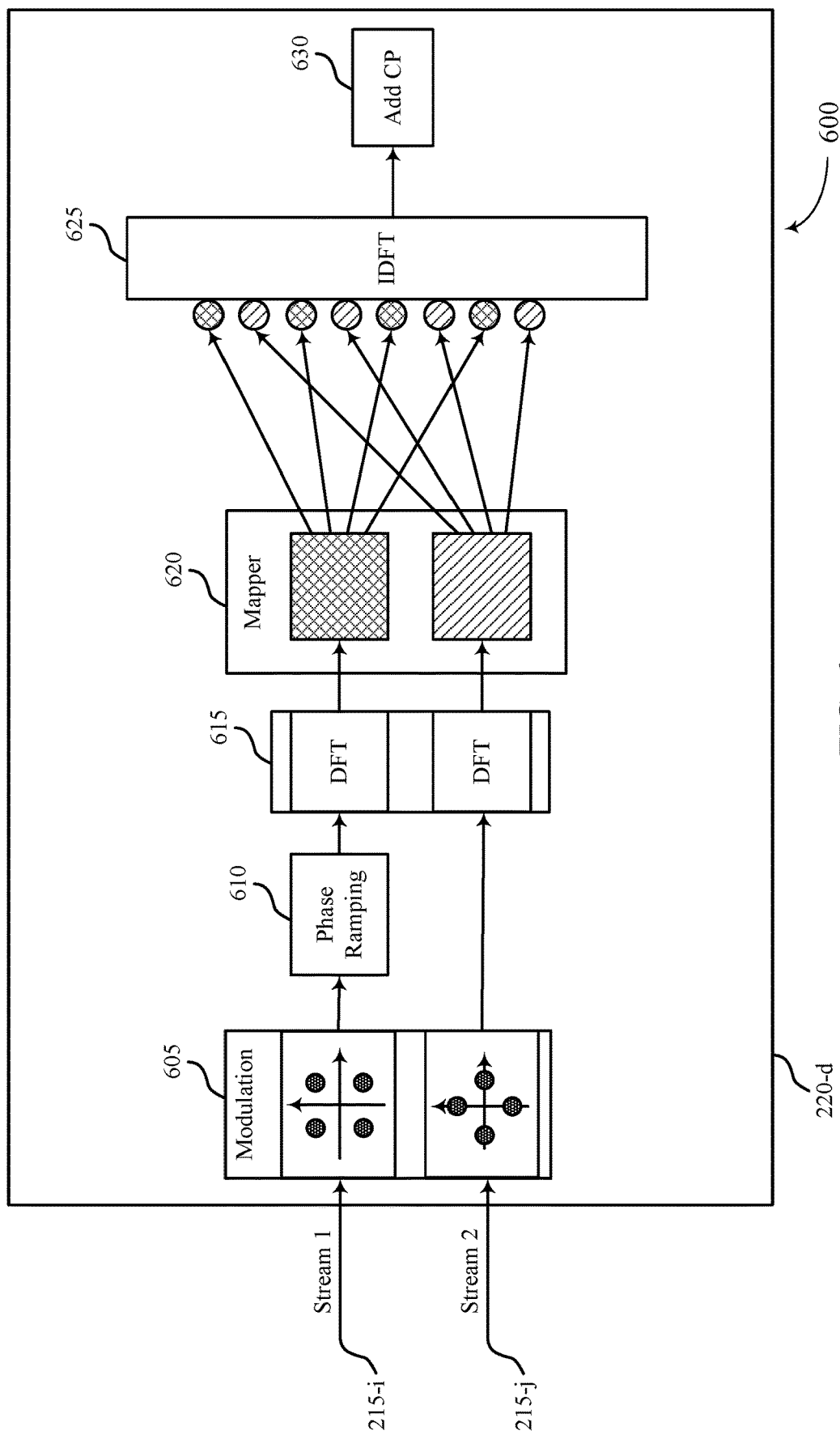

FIG. 6 illustrates an example diagram 600 of a transmission stream processor 220-d that supports time domain phase ramping for interlacing of multiple DFT spread waveforms in accordance with various aspects of the present disclosure. In some examples, transmission stream processor 220-d may be an example of a transmission stream processor 220 of a UE 115 as described with reference to FIG. 2. Transmission stream processor 220-d may include a modulator 605, phase ramper 610, Fourier transformer 615, mapper 620, inverse Fourier transformer 625, and a cyclic prefix adder 630. These components may be used to process bit streams 215 for an uplink transmission from a UE 115. Although FIG. 6 illustrates an example including two (2) streams, it should be understood that the techniques described herein also apply to processing more than two (2) streams for an uplink transmission.

As described with reference to FIGS. 1 through 3, the mapping of modulated symbols associated with different signals to interleaved subsets of a set of frequency resources may increase the PAPR of an uplink transmission. This may be due to the phase ramp introduced by the frequency domain offset between tones of a specific signal. Transmission stream processor 220-d may support efficient techniques for compensating for the phase ramp introduced by the frequency domain offset. Specifically, transmission stream processor 220-d may include a phase ramper 610 that introduces a phase ramp in the time domain to compensate for the frequency domain offset.

In some cases, UE 115 may identify a first bit stream 215-i and a second bit stream 215-j for transmission in an uplink transmission (e.g., in a given symbol period of the uplink transmission). In this example, modulator 505 modulates the first bit stream 215-g according to a quadrature phase-shift keying (QPSK) modulation scheme, and modulator 505 modulates the second bit stream 215-h according to a rotated QPSK modulation scheme. Phase ramper 610 then phase ramps the modulated symbols of the first bit stream 215-i in the time domain. That is, prior to transforming the signals to the frequency domain, the transmission stream processor 220-d may introduce a phase ramp in the time domain. By applying a phase ramp to modulated symbols of the first bit stream in combination with using different modulation schemes for the different waveforms, transmission stream processor 220-d may produce signals that have a known alignment in the time domain after further processing, such that the PAPR of the final uplink transmission is reduced. The phase ramp may be determined based on various equations to reduce the PAPR of an uplink transmission. For example, the phase ramp may be calculated according to equation 1 given above.

In the example of FIG. 6, the different waveforms are modulated according to a QPSK modulation scheme and a rotated QPSK modulation scheme. However, in other examples, the different waveforms may be modulated according to different modulation schemes and may, in some cases, have different modulation orders. In some cases, the condition for applying the above techniques to signals modulated according to different modulation schemes may be that there may be no zero crossing between modulated symbols of different waveforms. That is, if the modulated symbols of the first bit stream 215 is superimposed over the modulated symbols of the second bit stream 215, each modulated symbol of the first bit stream may share the same quadrant as a modulated symbol of the second bit stream. For two or more streams, the phase rotation of the modulation schemes for the streams may depend on the number of streams and the modulation orders of the streams.

Figure 7:
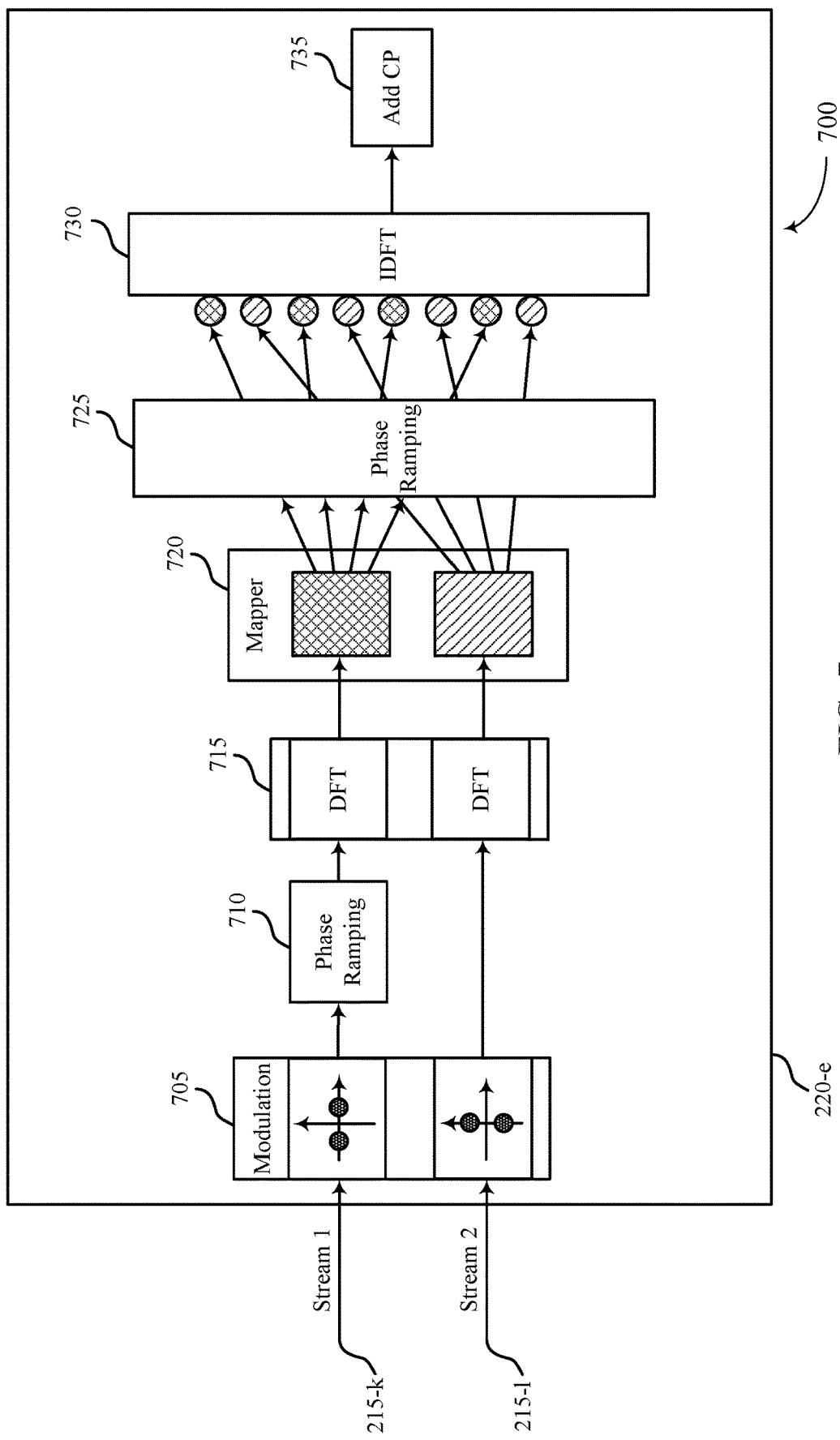

FIG. 7 illustrates an example diagram 700 of a transmission stream processor 220-*e* that supports time domain phase ramping for interlacing of multiple DFT spread waveforms in accordance with various aspects of the present disclosure. In some examples, transmission stream processor 220-*e* may be an example of a transmission stream processor 220 of a UE 115 as described with reference to FIG. 2. Transmission stream processor 220-*e* may include a modulator 705, time domain phase ramper 710, Fourier transformer 715, mapper 720, frequency domain phase ramper 725, inverse Fourier transformer 730, and a cyclic prefix adder 735. These components may be used to process bit streams 215 for an uplink transmission from a UE 115. Although FIG. 7 illustrates an example including two (2) streams, it should be understood that the techniques described herein also apply to processing more than two (2) streams for an uplink transmission.

As described with reference to FIGS. 1 through 3, the mapping of modulated symbols associated with different signals to interleaved subsets of a set of frequency resources may increase the PAPR of an uplink transmission. This may be due to the phase ramp introduced by the frequency domain offset between tones of a specific signal. Transmission stream processor 220-*e* may support efficient techniques for compensating for the phase ramp introduced by the frequency domain offset. Specifically, transmission stream processor 220-*e* may include a phase ramper 710 that introduces a phase ramp in the time domain and a phase ramper 725 that introduces a phase ramp in the frequency domain to compensate for the frequency domain offset.

In some cases, UE 115 may identify a first bit stream 215-*k* and a second bit stream 215-1. In this example, modulator 705 modulates the first bit stream 215-*k* according to a BPSK modulation scheme, and modulator 705 modulates the second bit stream 215-1 according to a rotated BPSK modulation scheme. Time domain phase ramper 710 then phase ramps the modulated symbols of the first bit stream 215-*k* in the time domain. That is, prior to transforming the signals to the frequency domain, the transmission stream processor 220-*e* may introduce a phase ramp in the time domain. By applying a phase ramp to modulated symbols of the first bit stream in combination with using different modulation schemes for the different waveforms, transmission stream processor 220-*e* may produce signals that align in the time domain after further processing, such that the PAPR of the final uplink transmission is reduced. The phase ramp may be determined based on various equations to reduce the PAPR of an uplink transmission. For example, the phase ramp may be calculated according to equation 1 given above.

Additionally, transmission stream processor 220-*e* may phase ramp the modulated symbols after Fourier transformer 715 converts the time domain signals into frequency domain signals and mapper 720 maps the frequency domain signals to tones. Specifically, frequency domain phase ramper 725 may introduce a frequency domain phase ramp to the mapped frequency domain signals. In addition, prior to mapping the modulated symbols to the frequency resources, mapper 720 may repeat the first and second frequency domain signals in the frequency domain (i.e., upsample the signals in the time domain). Subsequently, frequency domain phase ramper 725 may apply a frequency domain phase ramp to one or more of the first or second frequency domain signals to introduce a time domain offset between the two (2) waveforms. This additional phase ramp may further help to reduce the PAPR of the uplink transmission. The frequency domain phase ramp may be determined based on various equations to reduce the PAPR of an uplink transmission. In some examples, the phase ramp may have an inverse direction to the phase ramp used in the time domain for one or more streams. For example, the phase ramp may be calculated based on the following equation:

$$\text{Phase Ramp} = e^{\wedge}\left(j*2*\frac{\pi}{2*(DFT \text{ size})}*\text{tone index}\right) \quad (2)$$

where DFT size corresponds to the size of the DFT spreading, and the tone index is associated with the tones to which the modulated symbols are to be mapped for transmission in the symbol period.

In the example of FIG. 7, the different waveforms are modulated according to a BPSK modulation scheme and a rotated BPSK modulation scheme. However, in other examples, the different waveforms may be modulated according to different modulation schemes. In some cases, the condition for applying the above techniques to signals modulated according to different modulation schemes may be that there may be no zero crossing between modulated symbols of different bit streams. That is, if the modulated symbols of the first bit stream 215 is superimposed over the modulated symbols of the second bit stream 215, each modulated symbol of the first bit stream may share the same quadrant as a modulated symbol of the second bit stream. Although FIG. 7 illustrates an example including two (2) streams, it should be understood that the techniques described herein also apply to processing more than two (2) streams for an uplink transmission. For two or more streams, the phase rotation of the modulation schemes for the streams may depend on the number of streams and the modulation orders of the streams.

Figure 8:
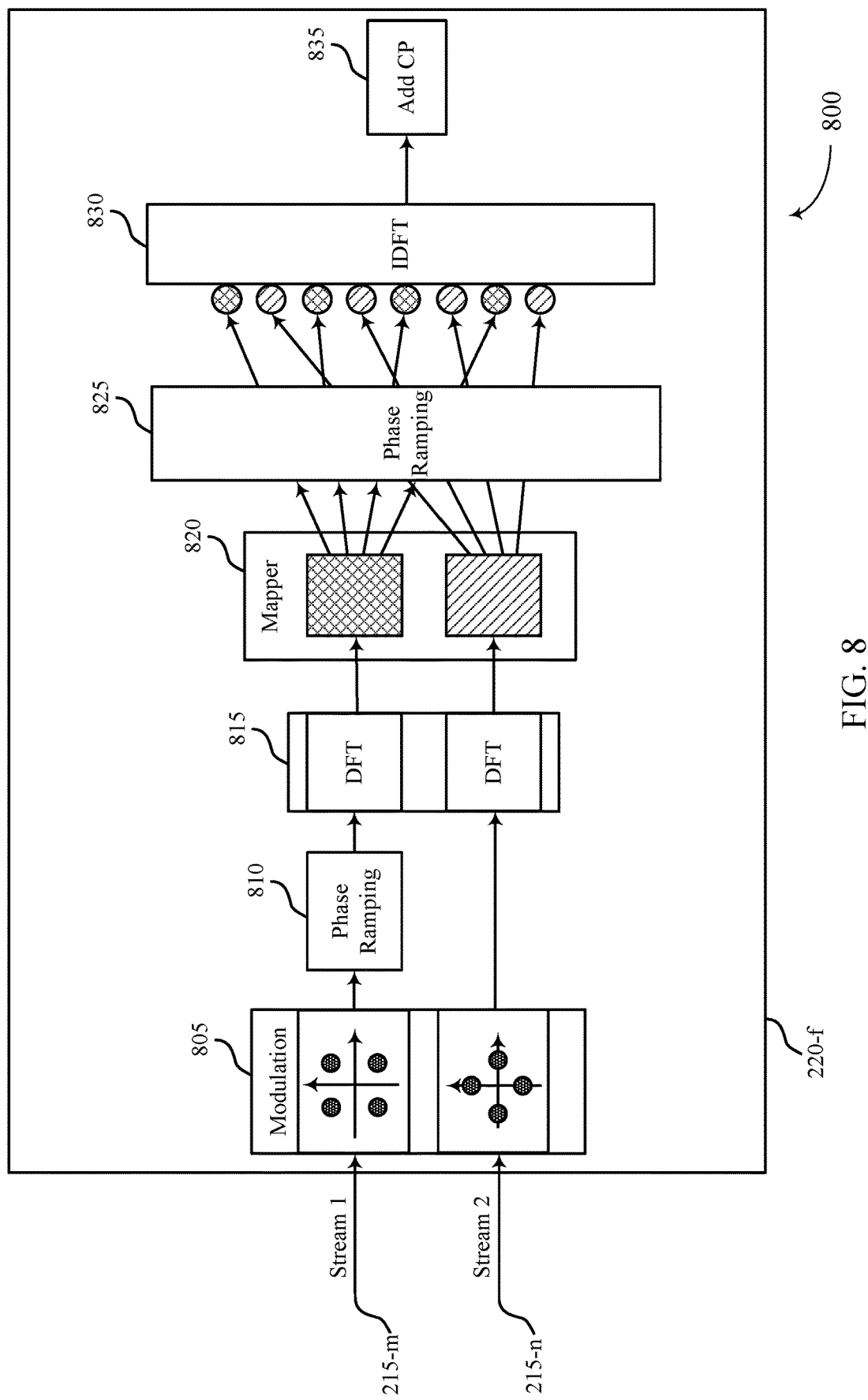

FIG. 8 illustrates an example diagram 800 of a transmission stream processor 220-*f* that supports time domain phase ramping for interlacing of multiple DFT spread waveforms in accordance with various aspects of the present disclosure. In some examples, transmission stream processor 220-*f* may be an example of a transmission stream processor of a UE 115 as described with reference to FIG. 2. Transmission stream processor 220-*f* may include a modulator 805, time domain phase ramper 810, Fourier transformer 815, mapper 820, frequency domain phase ramper 825, inverse Fourier transformer 830, and a cyclic prefix adder 835. These components may be used to process bit streams 215 for an uplink transmission from a UE 115. Although FIG. 8 illustrates an example including two (2) streams, it should be understood that the techniques described herein also apply to processing more than two (2) streams for an uplink transmission.

As described with reference to FIGS. 1 through 3, the mapping of modulated symbols associated with different signals to interleaved subsets of a set of frequency resources may increase the PAPR of an uplink transmission. This may be due to the phase ramp introduced by the frequency domain offset between tones of a specific signal. Transmission stream processor 220-*f* may support efficient techniques for compensating for the phase ramp introduced by the frequency domain offset. Specifically, transmission stream processor 220-*f* may include a phase ramper 810 that introduces a phase ramp in the time domain and a phase ramper 825 that introduces a phase ramp in the frequency domain to compensate for the frequency domain offset.

In some cases, UE 115 may identify a first bit stream 215-*m* and a second bit stream 215-*n*. In this example, modulator 805 modulates the first bit stream 215-*m* according to a QPSK modulation scheme, and modulator 805 modulates the second bit stream 215-*n* according to a rotated QPSK modulation scheme. Time domain phase ramper 810 then phase ramps the modulated symbols of the first bit stream 215-*m* in the time domain. That is, prior to transforming the signals to the frequency domain, phase ramper 810 may introduce a phase ramp in the time domain. By applying a phase ramp to modulated symbols of the first bit stream in combination with using different modulation schemes for the different waveforms, transmission stream processor 220-*f* may produce signals that align in the time domain after further processing, such that the PAPR of the final uplink transmission is reduced. For example, the phase ramp may be calculated according to equation 1 given above.

Additionally, transmission stream processor 220-*f* may phase ramp the modulated symbols after Fourier transformer 815 converts the time domain signals into frequency domain signals. Specifically, frequency domain phase ramper 825 may introduce a frequency domain phase ramp to the mapped frequency domain signals. In addition, prior to mapping the modulated symbols to the frequency resources, mapper 820 may repeat the first and second frequency domain signals in the frequency domain (i.e., upsample the signals in the time domain). In some cases, mapper 820 may repeat a frequency domain signal (e.g., either the first frequency domain signal, the second frequency domain signal, or any other frequency domain signal received by mapper 820) in the frequency domain by mapping each frequency domain symbol included in the frequency domain signal to more than one subcarrier. For example, Fourier transformer 815 may generate the frequency domain signal as comprising N frequency domain symbols indexed 0, 1, 2 . . . N. Mapper 820 may map each of the N frequency domain symbols to a first subset of a set of subcarriers and also map each of the N frequency domain symbols (that is, a duplicate set of the N frequency domain symbols) to a second subset of the set of subcarriers. Thus, mapper 820 may map a given one of the N frequency domain symbols to more than one subcarrier (e.g., one subcarrier in the first subset of the set of subcarriers and one subcarrier in the second subset of the set of subcarriers). In some cases, mapper 820 may repeat the frequency domain symbols included in the frequency domain signal in indexed order (e.g., map frequency domain symbols 0, 1, 2 . . . N to a first subset of subcarriers of increasing frequency and also map frequency domain symbols 0, 1, 2 . . . N to a second subset of subcarriers of increasing frequency, where the lowest-frequency subcarrier in the second subset of carriers is higher in frequency than the highest-frequency subcarrier in the first subset. It is to be understood that mapper 820 may repeat the frequency domain signal any number of times in the frequency domain—e.g., may map the frequency domain signal to any number of subsets of the set of subcarriers, and thus a subset of the set of subcarriers to which mapper 820 maps the frequency domain signal may in fact comprise any number of subsets of subcarriers, each carrying a complete representation of the frequency domain signal. It is further to be understood that any mapper in accordance with the improved techniques described herein (e.g., mapper 415, mapper 520, mapper 620, mapper 720, mapper 820) may similarly repeat one or more frequency domain signals in the frequency domain. Subsequently, frequency domain phase ramper 825 may apply a frequency domain phase ramp to the one or more of the mapped first or second frequency domain signals to introduce a time domain offset between the two (2) waveforms. This additional phase ramp may further help to reduce the PAPR of the uplink transmission. The frequency domain phase ramp may be determined based on various equations to reduce the PAPR of an uplink transmission. For example, the phase ramp may be calculated according to equation 2 given above.

In the example of FIG. 8, the different waveforms are modulated according to a QPSK modulation scheme and a rotated QPSK modulation scheme. However, in other examples, the different waveforms may be modulated according to different modulation schemes. In some cases, the condition for applying the above techniques to signals modulated according to different modulation schemes may be that there may be no zero crossing between modulated symbols of different bit streams. That is, if the modulated symbols of the first bit stream 215 is superimposed over the modulated symbols of the second bit stream 215, each modulated symbol of the first bit stream may share the same quadrant as a modulated symbol of the second bit stream. For two or more streams, the phase rotation of the modulation schemes for the streams may depend on the number of streams and the modulation orders of the streams.

Figure 9:
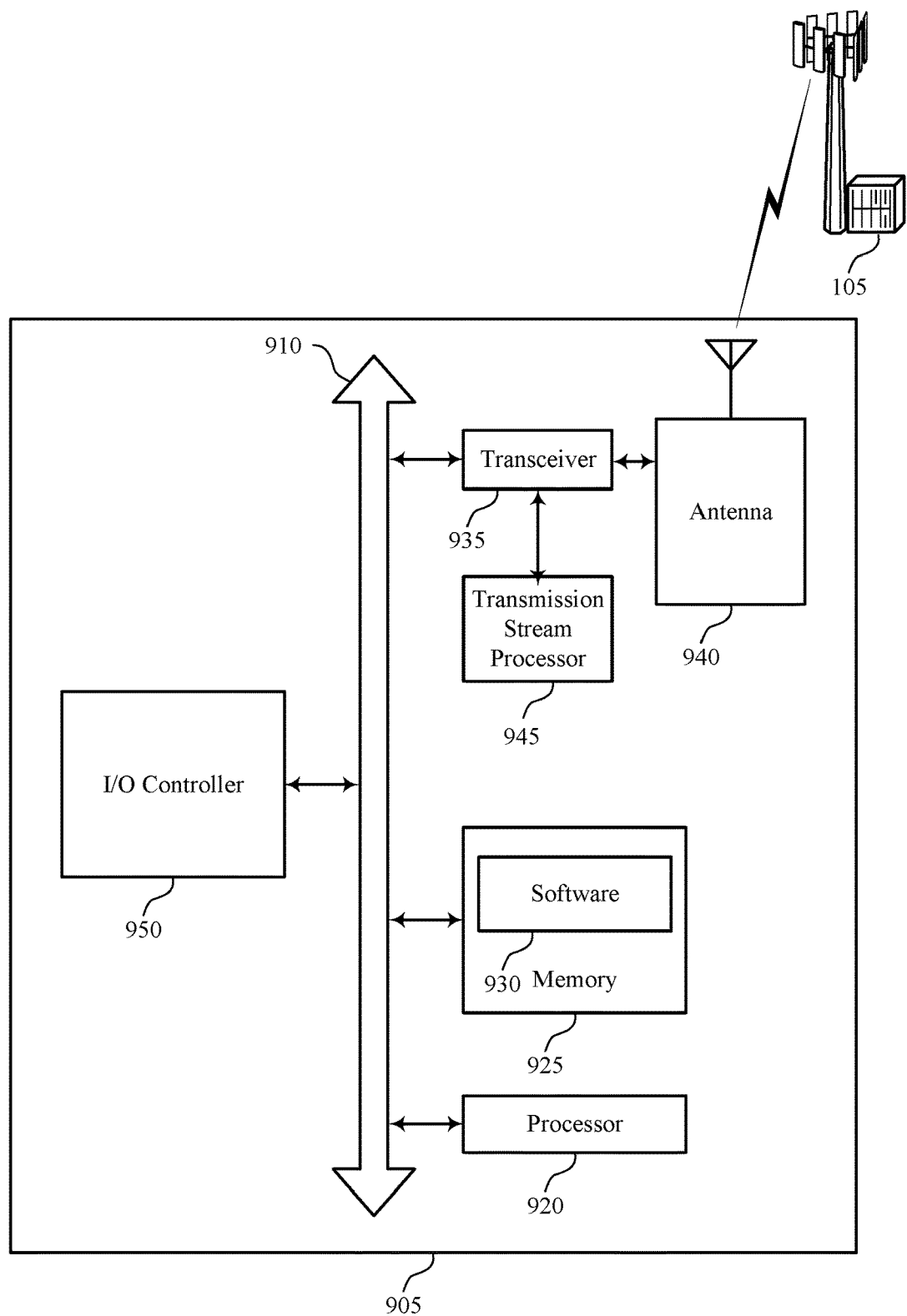
FIG. 9 illustrates a diagram of a system including a device that supports time domain phase ramping for interlacing of multiple DFT spread waveforms in accordance with various aspects of the present disclosure.

FIG. 9 illustrates a diagram of a system 900 including a device 905 that supports time domain phase ramping for interlacing of multiple DFT spread waveforms in accordance with various aspects of the present disclosure. Device 905 may be an example of or include the components of a UE 115 as described with reference to FIGS. 1 through 8. Device 905 may include components for bi-directional voice and data communications including components for transmitting and receiving communications, including processor 920, memory 925, software 930, transceiver 935, antenna 940, transmission stream processor 945, and I/O controller 950. These components may be in electronic communication via one or more busses (e.g., bus 910). Device 905 may communicate wirelessly with one or more UEs 115.

Processor 920 may include an intelligent hardware device, (e.g., a general-purpose processor, a DSP, a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting time domain phase ramping for interlacing of multiple DFT spread waveforms).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware and/or software operation such as the interaction with peripheral components or devices.

Software 930 may include code to implement aspects of the present disclosure, including code to support time domain phase ramping for interlacing of multiple DFT spread waveforms. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas. In some cases, the wireless device may include a single antenna 940. However, in some cases, the device may have more than one antenna 940, which may be capable of concurrently transmitting or receiving multiple wireless transmissions.

Transceiver 935 may coordinate with a transmission stream processor 945 to process signals for an uplink transmission. Transmission stream processor 945 may include aspects of transmission stream processors 220 as described with reference to FIGS. 4 through 8. In some cases, transmission stream processor 945 may apply a phase ramp in the time domain to a first set of symbols to obtain a set of phase-ramped time domain symbols, the first set of symbols being modulated according to a first symbol constellation for a transmission in a symbol period, perform frequency domain spreading of the set of phase-ramped time domain symbols to obtain a first frequency domain signal, map the first frequency domain signal to a first subset of a set of subcarriers for the transmission and a second frequency domain signal to a second subset of the set of subcarriers, where the second frequency domain signal is based at least in part on a second set of symbols modulated according to a second symbol constellation, generate a time domain waveform for the transmission based on a frequency to time domain transform of the mapped first and second frequency domain signals to the set of subcarriers, and transmit the time domain waveform to a receiver.

In some cases, the transmission stream processor 945 may apply a second phase ramp in the time domain to the second set of symbols, and perform frequency domain spreading of the phase-ramped second set of symbols to obtain the second frequency domain signal. In some cases, the mapping comprises mapping a third frequency domain signal to a third subset of the set of subcarriers, and the third frequency domain signal is based at least in part on a third set of symbols modulated according to a third symbol constellation. In some cases, the transmission stream processor 945 may apply a third phase ramp in the time domain to the third set of symbols and perform frequency domain spreading of the phase-ramped third set of symbols to obtain the third frequency domain signal.

In some cases, the second symbol constellation may be different from the first symbol constellation. In some cases the second symbol constellation corresponds to the first symbol constellation with a symbol rotation. In some cases the symbol rotation is based on a modulation order of the first symbol constellation. In some cases, the second symbol constellation has a different modulation order than the first symbol constellation. In some cases, the first symbol constellation and the second symbol constellation are a same symbol constellation. In some cases, the phase ramp for the first set of symbols is based on respective subcarrier mapping indexes for the mapping of the first frequency domain signal.

In some cases, the phase ramp for the first set of symbols is based on a spreading length of the frequency domain spreading. In some cases, the phase ramp for the first set of symbols is based on a size of the frequency to time domain transform. In some cases, the first subset and the second subset of the set of subcarriers comprise interleaved subsets of the set of subcarriers. In some cases, each symbol within the first symbol constellation has a corresponding symbol in the second symbol constellation, and a translation from the each symbol to the corresponding symbol does not cross a null symbol energy level. In some cases, the first symbol constellation is a BPSK constellation, a QPSK constellation, or a QAM constellation. In some cases, the first set of symbols comprise a first type of information and the second set of symbols comprise a second, different type of information. In some cases, the second frequency domain signal comprises a frequency domain reference signal sequence.

I/O controller 950 may manage input and output signals for device 905. I/O controller 950 may also manage peripherals not integrated into device 905. In some cases, I/O controller 950 may represent a physical connection or port to an external peripheral. I/O controller 950 may represent or interact with a modem, a keyboard, a mouse, a touchscreen, or a similar device. In some cases, Processor 920 may utilize an operating system such as iOS®, ANDROID®, MS-DOS®, MS-WINDOWS®, OS/2®, UNIX®, LINUX®, or another known operating system. In some cases, I/O controller 950 may be implemented as part of processor 920. In some cases, a user may interact with device 905 via I/O controller 950 or via hardware components controlled by I/O controller 950.

Figure 10:
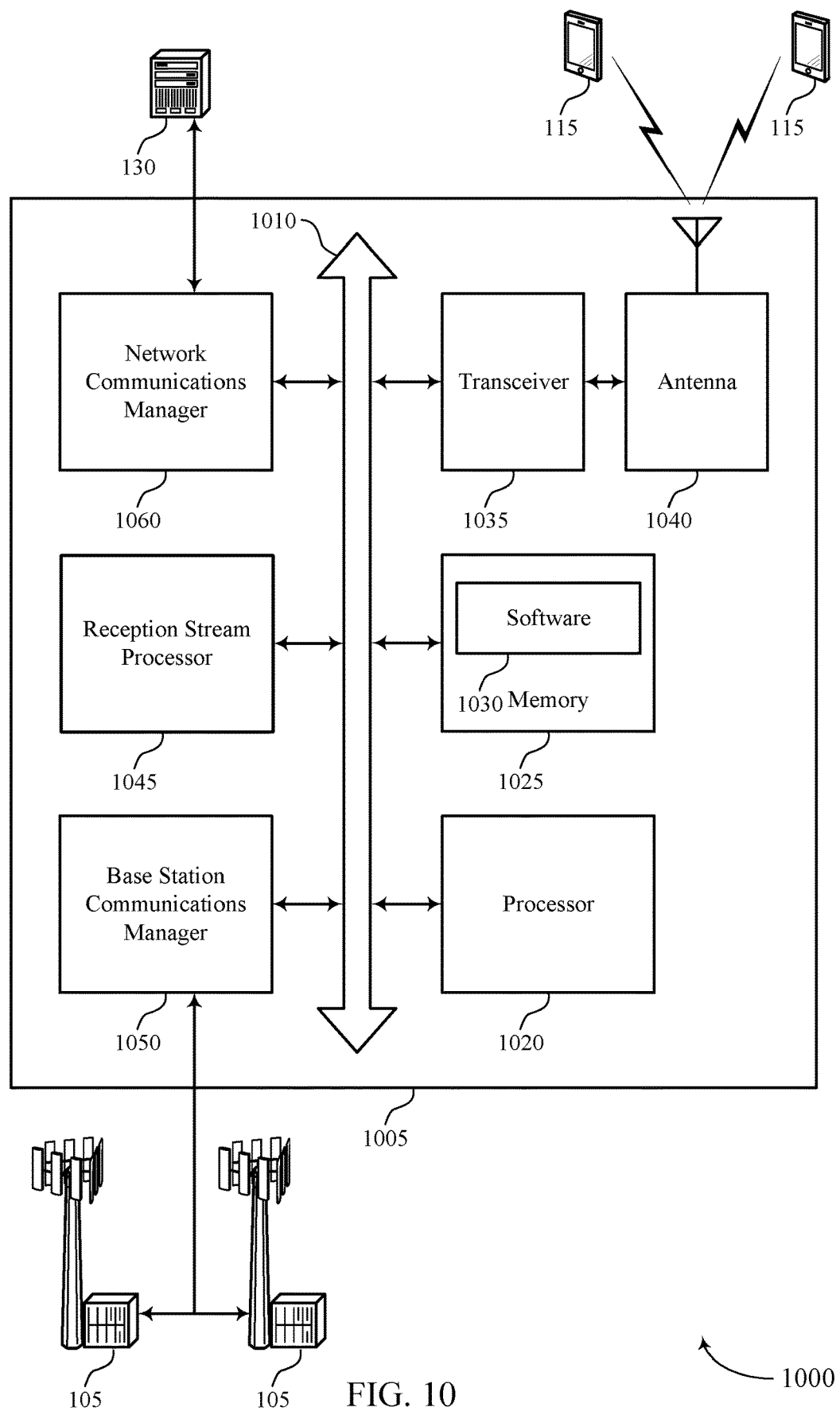
FIG. 10 illustrates a diagram of a system including a device that supports time domain phase ramping for interlacing of multiple DFT spread waveforms in accordance with various aspects of the present disclosure.

FIG. 10 illustrates a diagram of a system 1000 including a device 1005 that supports time domain phase ramping for interlacing of multiple DFT spread waveforms in accordance with various aspects of the present disclosure. Device 1005 may be an example of or include the components of base station 105 as described above, e.g., with reference to FIG. 1. Device 1005 may include components for bi-directional voice and data communications including components for transmitting and receiving communications, including processor 1020, memory 1025, software 1030, transceiver 1035, antenna 1040, network communications manager 1060, and base station communications manager 1050. These components may be in electronic communication via one or more busses (e.g., bus 1010). Device 1005 may communicate wirelessly with one or more UEs 105. Specifically, device 1005 may include a reception stream processor 1045 having components corresponding to the inverse functions (e.g., cyclic prefix removal, DFT, de-mapping, de-spreading, phase ramp removal) to the functions of a transmission stream processor 220 as described with reference to FIGS. 4 through 8. Reception stream processor 1045 may be an example of the reception stream processors as described with reference to FIGS. 11 through 15. Although illustrated as implemented in a device 1005 including the components of a base station 105, a reception stream processor 1045 may be implemented in any wireless communication device such as an access point, repeater, relay station, or UE 105.

Processor 1020 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020.

Processor 1020 may be configured to execute computer-readable instructions stored in a memory to perform various functions (e.g., functions or tasks supporting time domain phase ramping for interlacing of multiple DFT spread waveforms).

Memory 1025 may include RAM and ROM. The memory 1025 may store computer-readable, computer-executable software 1030 including instructions that, when executed, cause the processor to perform various functions described herein. In some cases, the memory 1025 may contain, among other things, a BIOS which may control basic hardware and/or software operation such as the interaction with peripheral components or devices.

Software 1030 may include code to implement aspects of the present disclosure, including code to support time domain phase ramping for interlacing of multiple DFT spread waveforms. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas. In some cases, the wireless device may include a single antenna 1040. However, in some cases the device may have more than one antenna 1040, which may be capable of concurrently transmitting or receiving multiple wireless transmissions.

Reception stream processor 1045 may receive a time domain waveform from a transmitter. Reception stream processor 1045 may generate a frequency domain waveform based on a time to frequency domain transform of the received time domain waveform to obtain a first frequency domain signal mapped to a first subset of a set of subcarriers and a second frequency domain signal mapped to a second subset of the set of subcarriers. Reception stream processor 1045 may perform a frequency to time domain transform on the first frequency domain signal to obtain a first set of phase-ramped time domain symbols. Reception stream processor 1045 may apply an inverse phase ramp in the time domain to obtain a first set of time domain symbols. Reception stream processor 1045 may identify, based on the first set of time domain symbols, a first set of symbols modulated according to a first symbol constellation. Reception stream processor 1045 may identify, based on the second frequency domain signal, a second set of symbols modulated according to a second symbol constellation.

In some cases, the second frequency domain signal includes a frequency domain reference signal sequence. In some cases, the second symbol constellation is different from the first symbol constellation. In some cases, the symbol rotation is based on a modulation order of the first symbol constellation. In some cases, the second symbol constellation has a different modulation order than the first symbol constellation. In some cases, the first symbol constellation and the second symbol constellation are a same symbol constellation. In some cases, each symbol within the first symbol constellation has a corresponding symbol in the second symbol constellation, and where a translation from the each symbol to the corresponding symbol does not cross a null symbol energy level. In some cases, the phase-ramped time domain symbols have a phase ramp that is based on at least one of a respective subcarrier mapping indexes for the mapping of the first frequency domain signal, a spreading length of the frequency domain spreading, a size of the frequency to time domain transform, or a combination thereof. In some cases, the first set of symbols include a first type of information and the second set of symbols include a second, different type of information. In some cases, the second symbol constellation corresponds to the first symbol constellation with a symbol rotation.

Network communications manager 1060 may manage communications with the core network (e.g., via one or more wired backhaul links). For example, the network communications manager 1060 may manage the transfer of data communications for client devices, such as one or more UEs 105.

Base station communications manager 1050 may manage communications with other base stations 105, and may include a controller or scheduler for controlling communications with UEs 105 in cooperation with other base stations 105. For example, the base station communications manager 1050 may coordinate scheduling for transmissions to UEs 105 for various interference mitigation techniques such as beamforming or joint transmission. In some examples, base station communications manager 1050 may provide an X2 interface within an LTE/LTE-A wireless communication network technology to provide communication between base stations 105.

Figure 11:
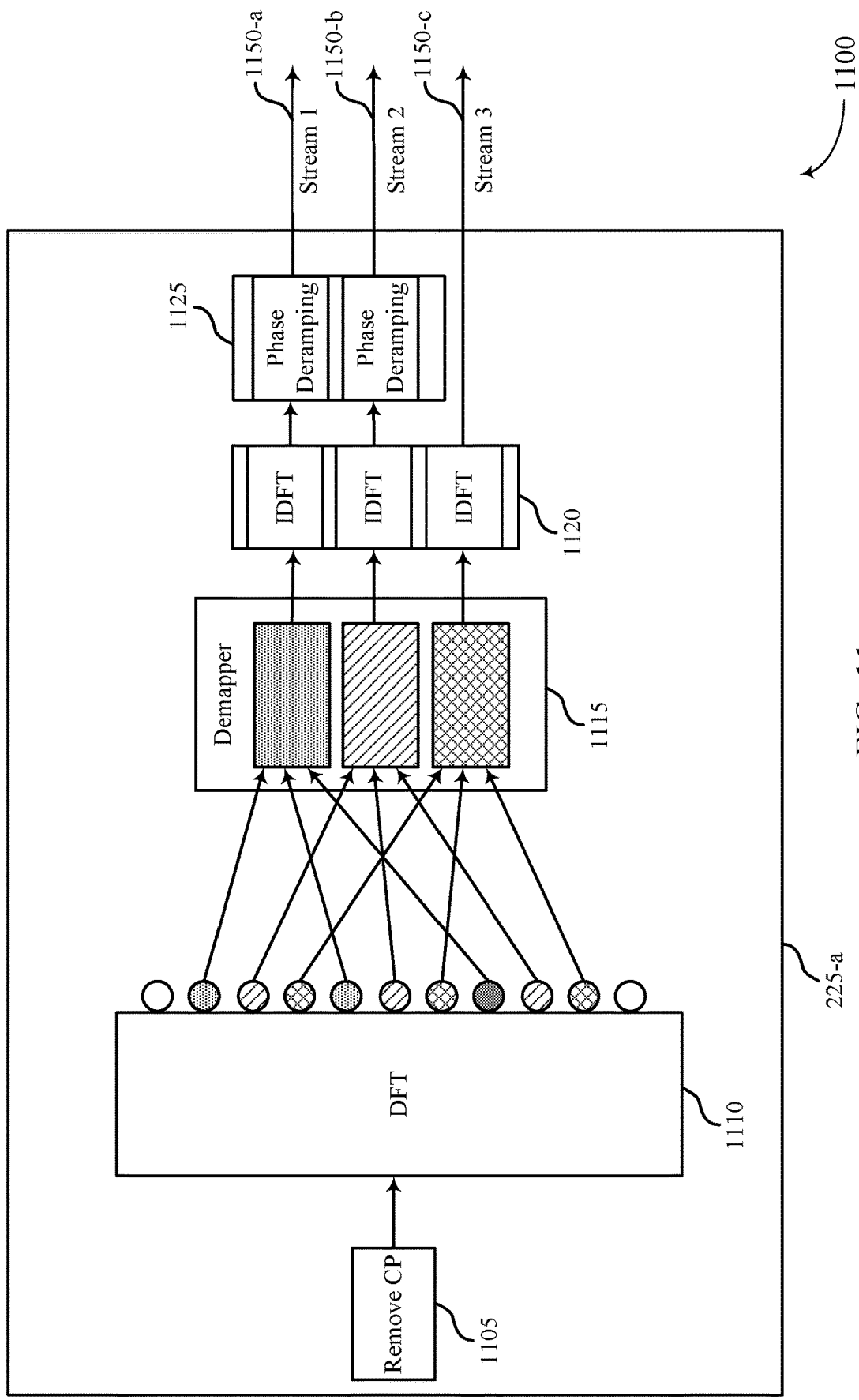
FIGS. 11 through 15 illustrate example diagrams of reception stream processors that support time domain phase ramping for interlacing of multiple DFT spread waveforms in accordance with various aspects of the present disclosure.

FIG. 11 illustrates an example diagram 1100 of a reception stream processor 225-*a* that supports time domain phase ramping for interlacing of multiple DFT spread waveforms in accordance with various aspects of the present disclosure. In some examples, reception stream processor 225-*a* may be an example of a reception stream processor 225 of a base station 105 as described with reference to FIG. 2. Reception stream processor 225-*b* may include a cyclic prefix remover 1105, a Fourier transformer 1110, a demapper 1115, an inverse Fourier transformer 1120, and a phase deramper 1125. These components may be used to process signals and generate bit streams 1150 from an uplink transmission received from a UE 115.

As described with reference to FIGS. 1 through 3, the mapping of modulated symbols associated with different streams to frequency multiplexed subsets of a set of frequency resources (e.g., subcarriers) may increase the PAPR of an uplink transmission. A transmission stream processor may introduce a phase ramp to the transmission stream to compensate for the frequency domain offset, as described with reference to FIGS. 4 through 8. Reception stream processor 225-*a* may correspondingly deramp the transmission stream to obtain the resulting bit streams 1150.

In some cases, signals received from a transmitter may be one or more time domain waveforms. In some cases, the received signals may each have a cyclic prefix appended to the time domain signal. Cyclic prefix remover 1105 may remove this appended cyclic prefix from the time domain signal. After removing the cyclic prefix, Fourier transformer 1110 may transform the signal from the time domain to the frequency domain, to identify information mapped to interleaved frequency domain resources (e.g., subcarriers). Then, demapper 1115 may perform a demapping operation to deinterleave the interleaved frequency domain resources to obtain frequency domain signals. The frequency domain signals then be input into inverse Fourier transformer 1120 to perform a frequency to time domain transform on the frequency domain signals to obtain sets of time domain symbols. These time domain symbols may have a phase ramp applied to them (e.g., these time domain symbols may be phase-ramped). Then, based on whether or not the sets of time domain symbols have a phase ramp applied, phase deramper 1125 may apply phase deramping (e.g., may apply an inverse phase ramp) to obtain the resulting bit stream 1150 modulated according to a particular symbol constellation (e.g., BPSK, QPSK, etc.).

Thus, for multiplexing of a given number of waveforms, some waveforms may have been phase ramped while other waveforms were not phase ramped, or all waveforms may be phase ramped. By applying this phase deramping technique, as described above, reception stream processor may efficiently decode signals that may have a known alignment that reduces the PAPR of the uplink transmission.

Figure 12:
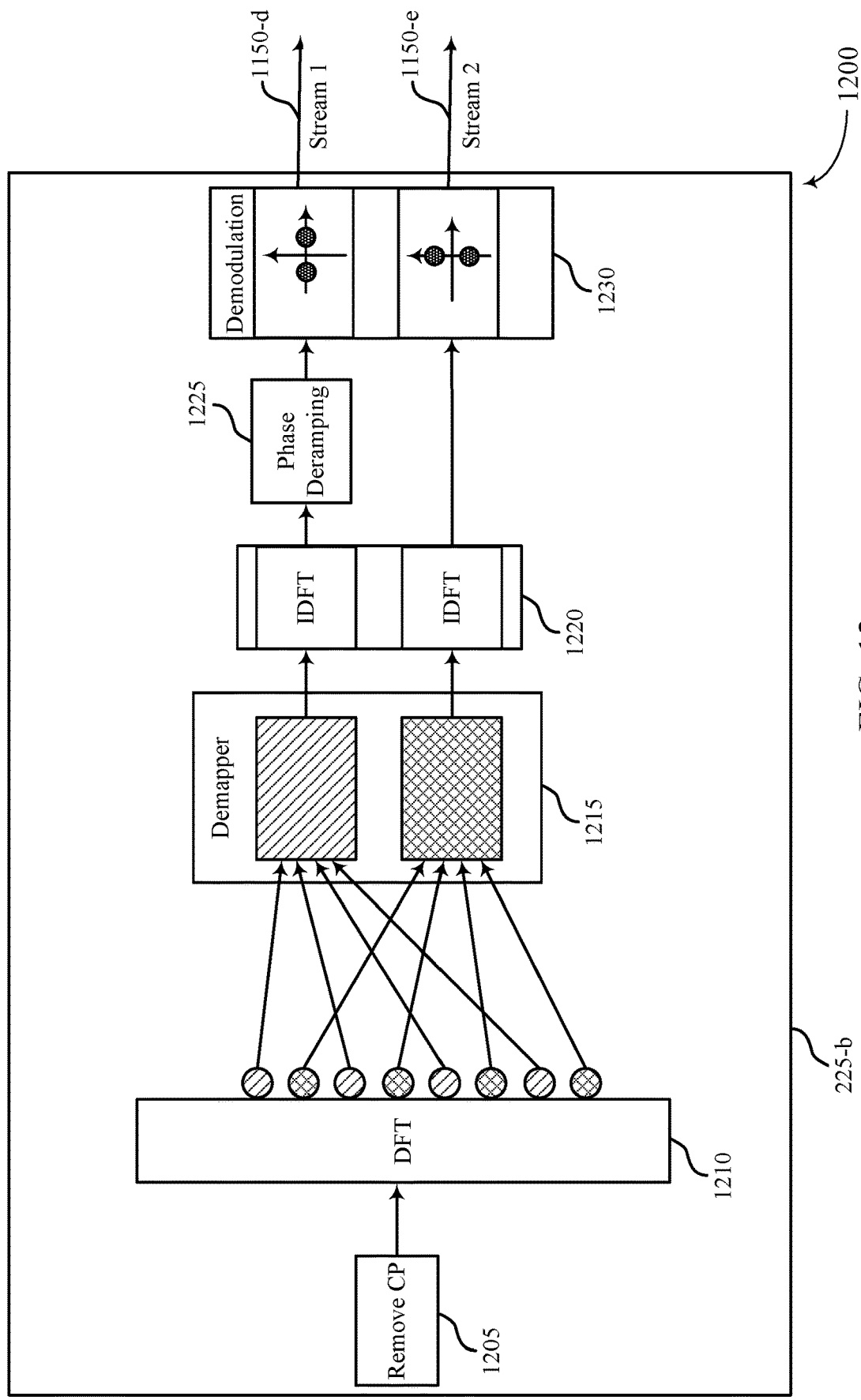

FIG. 12 illustrates an example diagram 1200 of a reception stream processor **225-*b* that supports time domain phase ramping for interlacing of multiple DFT spread waveforms in accordance with various aspects of the present disclosure. In some examples, reception stream processor 225-*b* may be an example of a reception stream processor 225 of a base station 105 as described with reference to FIG. 2. Reception stream processor 225-*b* may include a cyclic prefix remover 1205, a Fourier transformer 1210, a demapper 1215, an inverse Fourier transformer 1220, a phase deramper 1225, and a demodulator 1230. These components may be used to process signals and generate bit streams 1150 from an uplink transmission received from a UE 115**.

As described with reference to FIGS. 1 through 3, the mapping of modulated symbols associated with different streams to frequency multiplexed subsets of a set of frequency resources may increase the PAPR of an uplink transmission. A transmission stream processor may introduce a phase ramp to the transmission stream to compensate for the frequency domain offset, as described with reference to FIGS. 4 through 8. Reception stream processor **225-*b* may correspondingly deramp the transmission stream to obtain the resulting bit streams 1250**.

In some cases, signals received from a transmitter may be one or more time domain waveforms. In some cases, the received signals may each have a cyclic prefix appended to the time domain signal. Cyclic prefix remover 1205 may remove this appended cyclic prefix from the time domain signal. After removing the cyclic prefix, Fourier transformer 1210 may transform the signal from the time domain to the frequency domain, to identify information mapped to interleaved frequency domain resources. Then, demapper 1215 may perform a demapping operation to deinterleave the interleaved frequency domain resources to obtain frequency domain signals. The frequency domain signals may then be input into inverse Fourier transformer 1220 to perform a frequency to time domain transform on the frequency domain signals to obtain sets of time domain symbols. These time domain symbols may have a phase ramp applied to them (e.g., these time domain symbols may be phase-ramped). Then, based on whether or not the sets of time domain symbols have a phase ramp applied, phase deramper 1225 may apply phase deramping (e.g., may apply an inverse phase ramp) to obtain the resulting bit stream 1250 modulated according to a particular symbol constellation.

In the example of FIG. 12, the different waveforms are modulated according to a BPSK modulation scheme and a rotated BPSK modulation scheme. Demodulator 1230 accordingly applies a BPSK demodulation scheme and a rotated BPSK demodulation scheme to identify bit information for bits streams 1150 (e.g., hard-bit values, soft-bit values, LLRs, etc.) based on the respective sets of modulated symbols. However, in other examples, the different waveforms may be modulated according to different modulation schemes.

Although FIG. 12 illustrates an example including two (2) streams, it should be understood that the techniques described herein also apply to processing more than two (2) received transmission streams. In some cases, the phase rotation of the modulation schemes for the streams may depend on the number of streams and the modulation orders of the streams. For example, three streams using BPSK modulation schemes may be rotated by 0, pi/3, and 2*pi/3, respectively.

Figure 13:
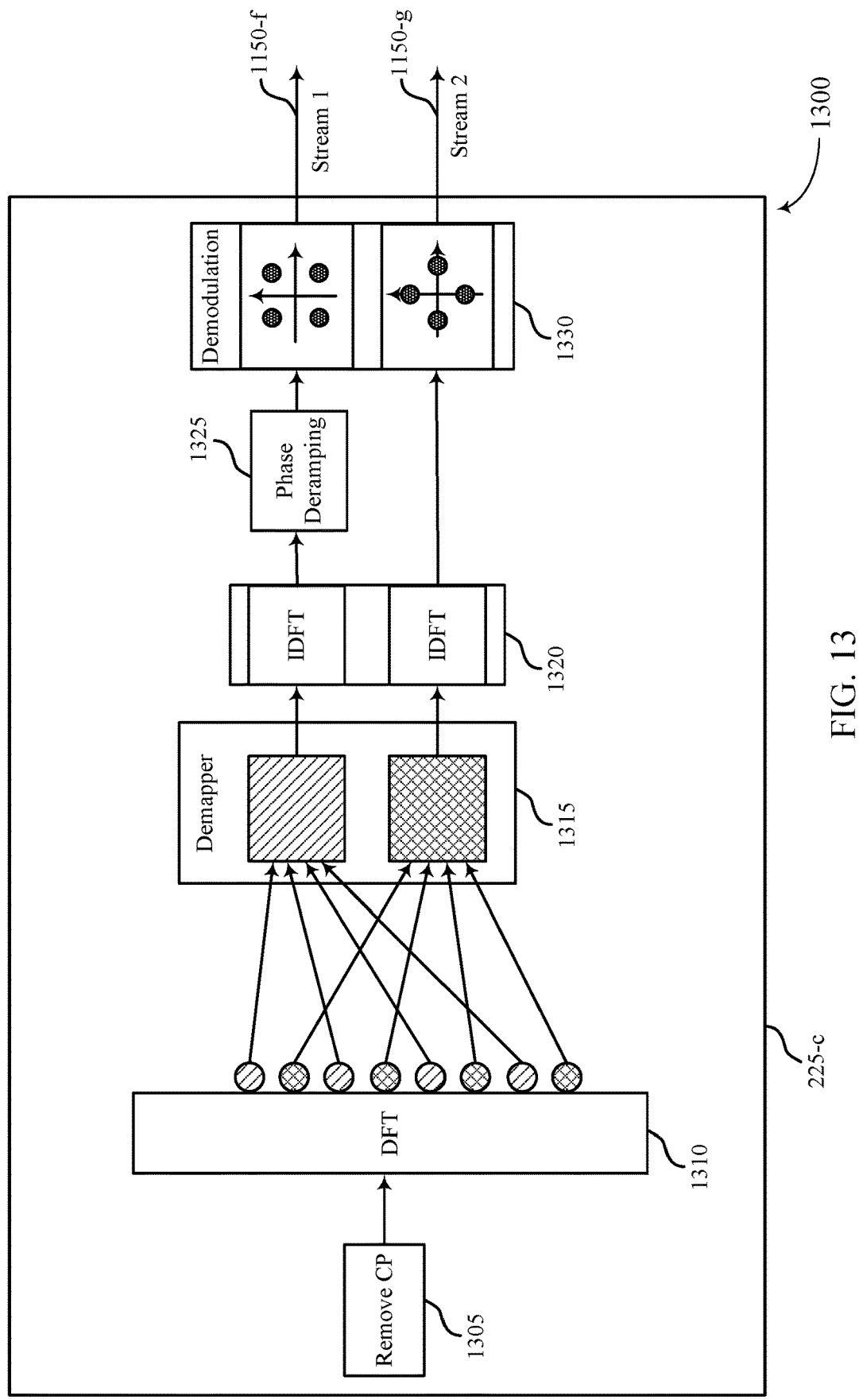

FIG. 13 illustrates an example diagram 1300 of a reception stream processor **225-*c* that supports time domain phase ramping for interlacing of multiple DFT spread waveforms in accordance with various aspects of the present disclosure. In some examples, reception stream processor 225-*c* may be an example of a reception stream processor 225 of a base station 105 as described with reference to FIG. 2. Reception stream processor 225-*c* may include a cyclic prefix remover 1305, a Fourier transformer 1310, a demapper 1315, an inverse Fourier transformer 1320, a phase deramper 1325, and a demodulator 1330. These components may be used to process signals and generate bit streams 1150 from an uplink transmission received from a UE 114. Although FIG. 13** illustrates an example including two (2) streams, it should be understood that the techniques described herein also apply to processing more than two (2) received transmission streams.

As described with reference to FIGS. 1 through 3, the mapping of modulated symbols associated with different streams to frequency multiplexed subsets of a set of frequency resources (e.g., subcarriers) may increase the PAPR of an uplink transmission. A transmission stream processor may introduce a phase ramp to the transmission stream to compensate for the frequency domain offset, as described with reference to FIGS. 4 through 8. Reception stream processor **225-*c* may correspondingly deramp the transmission stream to obtain the resulting bit streams 1150**.

In some cases, signals received from a transmitter may be one or more time domain waveforms. In some cases, the received signals may each have a cyclic prefix appended to the time domain signal. Cyclic prefix remover 1305 may remove this appended cyclic prefix from the time domain signal. After removing the cyclic prefix, Fourier transformer 1310 may transform the signal from the time domain to the frequency domain, to identify information mapped to interleaved frequency domain resources. Then, demapper 1315 may perform a demapping operation to deinterleave the interleaved frequency domain resources to obtain frequency domain signals. The frequency domain signals may then be input into inverse Fourier transformer 1320 to perform a frequency to time domain transform on the frequency domain signals to obtain sets of time domain symbols. These time domain symbols may have a phase ramp applied to them (e.g., these time domain symbols may be phase-ramped). Then, based on whether or not the sets of time domain symbols have a phase ramp applied, phase deramper 1325 may apply phase deramping (e.g., may apply an inverse phase ramp) to obtain the resulting bit stream 1250 modulated according to a particular symbol constellation.

In the example of FIG. 13, the different waveforms are modulated according to a QPSK modulation scheme and a rotated QPSK modulation scheme. Demodulator 1330 accordingly applies a QPSK demodulation scheme and a rotated QPSK demodulation scheme to identify bit information for bit streams 1150 (e.g., hard-bit values, soft-bit values, LLRs, etc.) based on the respective sets of modulated symbols. However, in other examples, the different waveforms may be modulated according to different modulation schemes and may, in some cases, have different modulation orders. For two or more streams, the phase rotation of the modulation schemes for the streams may depend on the number of streams and the modulation orders of the streams.

Figure 14:
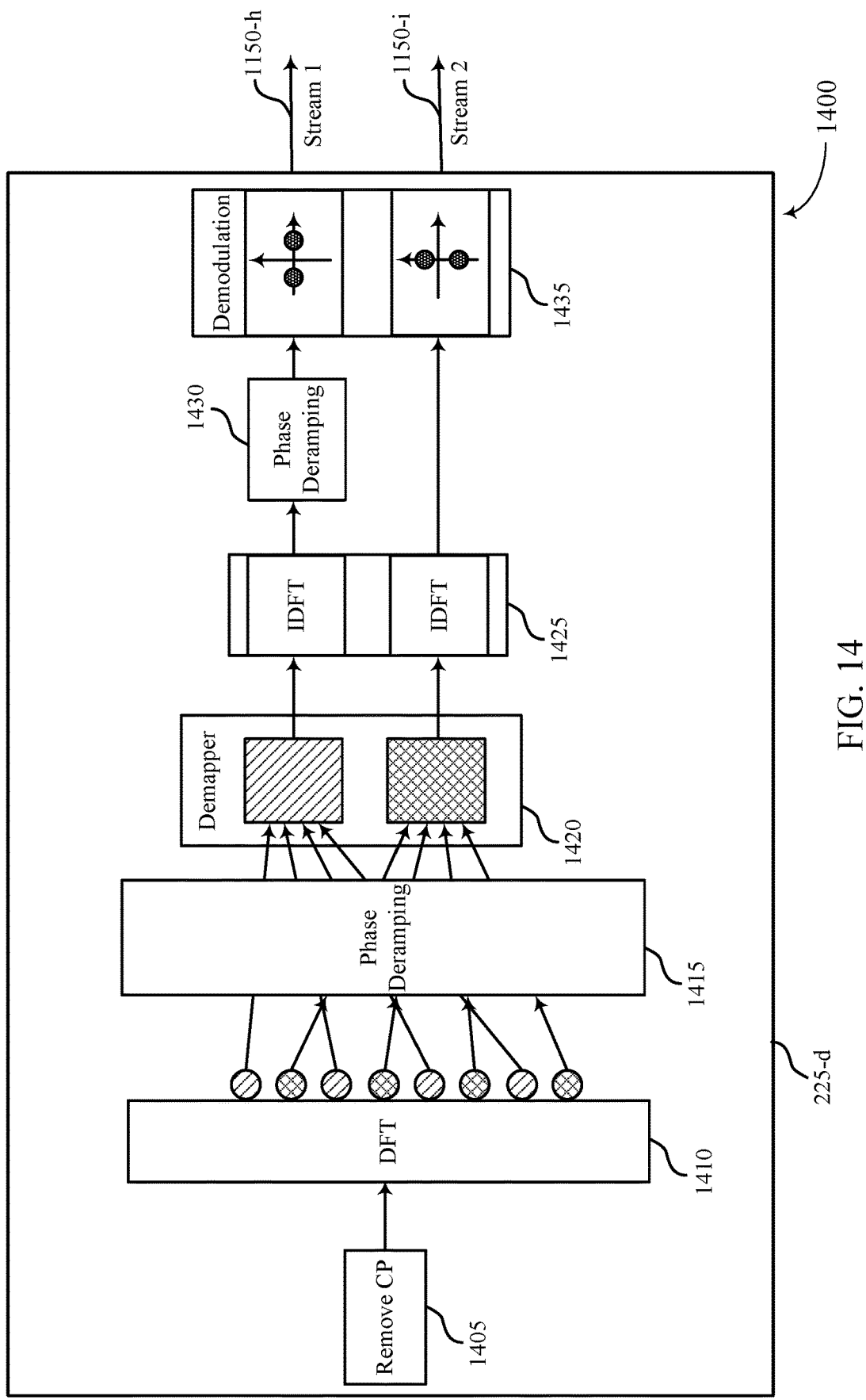

FIG. 14 illustrates an example diagram 1400 of a reception stream processor 225-d that supports time domain phase ramping for interlacing of multiple DFT spread waveforms in accordance with various aspects of the present disclosure. In some examples, reception stream processor 225-d may be an example of a reception stream processor 225 of a base station 105 as described with reference to FIG. 2. Reception stream processor 225-d may include a cyclic prefix remover 1405, a Fourier transformer 1410, a phase deramper 1415, a demapper 1420, an inverse Fourier transformer 1425, a phase deramper 1430, and a demodulator 1435. These components may be used to process signals and generate bit streams 1150 from an uplink transmission received from a UE 115. Although FIG. 14 illustrates an example including two (2) streams, it should be understood that the techniques described herein also apply to processing more than two (2) received transmission streams.

As described with reference to FIGS. 1 through 3, the mapping of modulated symbols associated with different streams to frequency multiplexed subsets of a set of frequency resources (e.g., subcarriers) may increase the PAPR of an uplink transmission. A transmission stream processor may introduce a phase ramp to the transmission stream to compensate for the frequency domain offset, as described with reference to FIGS. 4 through 8. In some cases, as described in FIG. 14, one or more of the transmission streams may have a phase ramp applied in the time domain and in the frequency domain. Reception stream processor 225-d may correspondingly deramp the transmission stream to obtain the resulting bit streams 1150.

In some cases, signals received from a transmitter may be one or more time domain waveforms. In some cases, the received signals may each have a cyclic prefix appended to the time domain signal. Cyclic prefix remover 1405 may remove this appended cyclic prefix from the time domain signal. After removing the cyclic prefix, Fourier transformer 1410 may transform the signal from the time domain to the frequency domain, to identify information mapped to interleaved frequency domain resources (e.g., subcarriers). These frequency domain resources may have a phase ramp applied to them in the frequency domain (e.g., these frequency domain symbols may be phase-ramped). Based on whether or not the sets of frequency domain resources have a phase ramp applied, phase deramper 1415 may apply phase deramping (e.g., may apply an inverse phase ramp) to un-phase ramp the sets of frequency domain resources. Then, demapper 1420 may perform a demapping operation to deinterleave the interleaved frequency domain resources to obtain frequency domain signals. The frequency domain signals may then be input into inverse Fourier transformer 1425 to perform a frequency to time domain transform on the frequency domain signals to obtain sets of time domain symbols. These time domain symbols may have a phase ramp applied to them in the time domain (e.g., these time domain symbols may be phase-ramped). Based on whether or not the sets of time domain symbols have such a phase ramp applied, phase deramper 1430 may apply phase deramping (e.g., may apply an inverse phase ramp) to obtain the resulting bit stream 1250 modulated according to a particular symbol constellation.

In the example of FIG. 14, the different waveforms are modulated according to a BPSK modulation scheme and a rotated BPSK modulation scheme. Demodulator 1435 accordingly applies a BPSK demodulation scheme and a rotated BPSK demodulation scheme to identify bit information for bits streams 1150 (e.g., hard-bit values, soft-bit values, LLRs, etc.) based on the respective sets of modulated symbols. However, in other examples, the different waveforms may be modulated according to different modulation schemes. Although FIG. 14 illustrates an example including two (2) streams, it should be understood that the techniques described herein also apply to processing more than two (2) streams for an uplink transmission. For two or more streams, the phase rotation of the modulation schemes for the streams may depend on the number of streams and the modulation orders of the streams.

Figure 15:
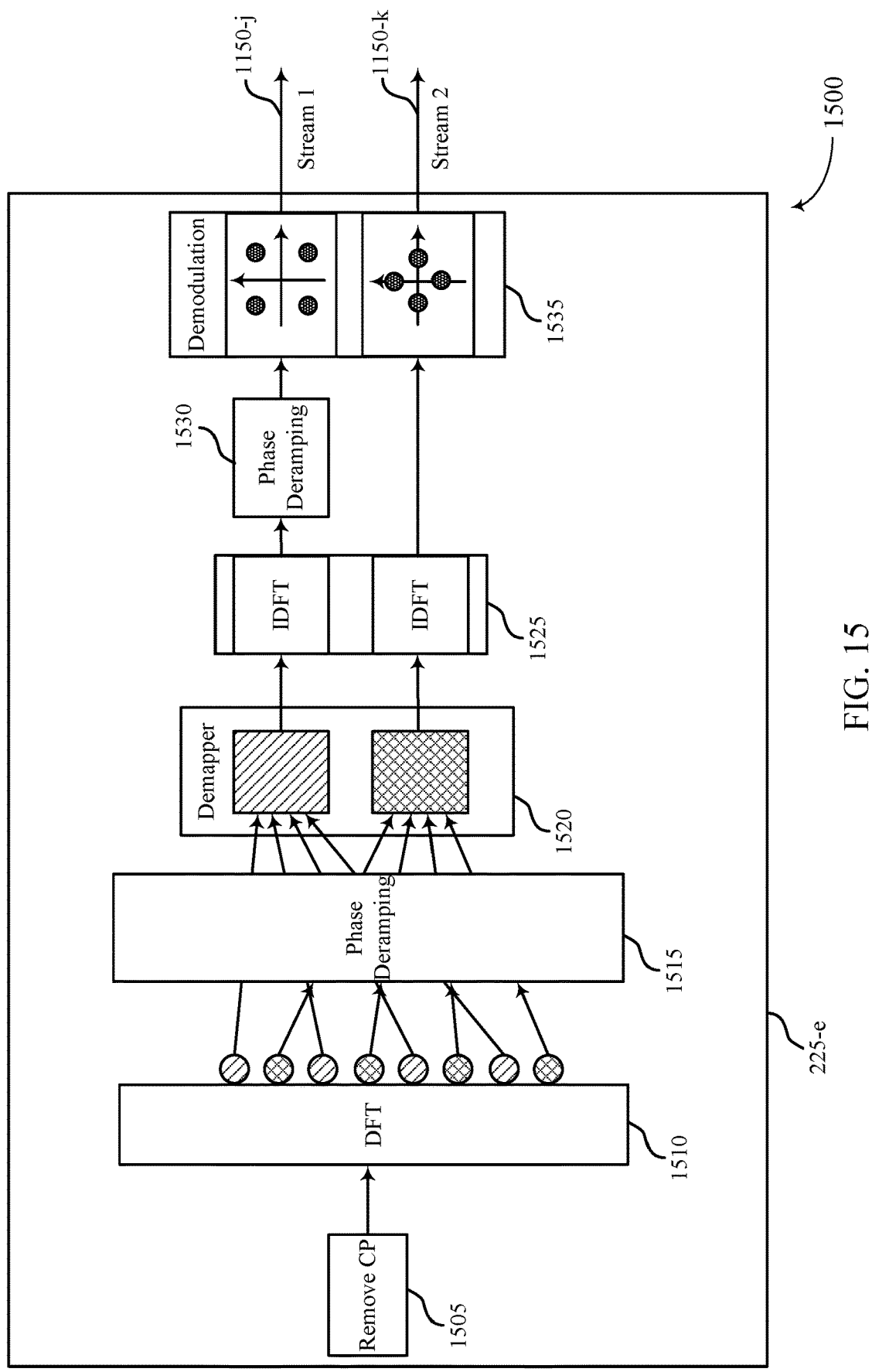

FIG. 15 illustrates an example diagram 1500 of a reception stream processor 225-e that supports time domain phase ramping for interlacing of multiple DFT spread waveforms in accordance with various aspects of the present disclosure. In some examples, reception stream processor 225-e may be an example of a reception stream processor of a base station 105 as described with reference to FIG. 2. Reception stream processor 225-e may include a cyclic prefix remover 1505, a Fourier transformer 1510, a phase deramper 1515, a demapper 1520, an inverse Fourier transformer 1525, a phase deramper 1530, and a demodulator 1535. These components may be used to process signals and generate bit streams 1150 from an uplink transmission received from a UE 115. Although FIG. 15 illustrates an example including two (2) streams, it should be understood that the techniques described herein also apply to processing more than two (2) received transmission streams.

As described with reference to FIGS. 1 through 3, the mapping of modulated symbols associated with different streams to frequency multiplexed subsets of a set of frequency resources (e.g., subcarriers) may increase the PAPR of an uplink transmission. A transmission stream processor may introduce a phase ramp to the transmission stream to compensate for the frequency domain offset, as described with reference to FIGS. 4 through 8. In some cases, as described in FIG. 15, one or more of the transmission streams may have a phase ramp applied in the time domain and in the frequency domain. Reception stream processor 225-e may correspondingly deramp the transmission stream to obtain the resulting bit streams 1150.

In some cases, signals received from a transmitter may be one or more time domain waveforms. In some cases, the received signals may each have a cyclic prefix appended to the time domain signal. Cyclic prefix remover 1505 may remove this appended cyclic prefix from the time domain signal. After removing the cyclic prefix, Fourier transformer 1510 may transform the signal from the time domain to the frequency domain, to identify information mapped to interleaved frequency domain resources (e.g., subcarriers). These frequency domain resources may have a phase ramp applied to them in the frequency domain (e.g., these frequency domain symbols may be phase-ramped). Based on whether or not the frequency domain resources have a phase ramp applied, phase deramper 1515 may apply phase deramping (e.g., may apply an inverse phase ramp) to un-phase ramp the sets of frequency domain resources. Then, demapper 1520 may perform a demapping operation to deinterleave the interleaved frequency domain resources to obtain frequency domain signals. In some cases, a frequency domain signal may have been repeated in the frequency domain (i.e., upsampled in the time domain). For example, each frequency domain symbol may have been mapped to more than one subcarrier, as described herein (e.g., in reference to FIG. 8). Demapper 1520 may identify repeated instances of a frequency domain symbol included in the frequency domain signal (e.g., based on configuration information or other information demapper 1520 may have received indicative of a repetitive mapping process used by a transmitting device) and may combine repeated instances of the frequency domain symbol to generate a combined version of the frequency domain symbol. Thus, demapper 1520 may in some cases obtain a frequency domain signal based on obtaining multiple instances of the frequency domain signal, each instance mapped to a distinct subset of a set of subcarriers, and combining each instance of the frequency domain signal. It is to be understood that any demapper in accordance with the improved techniques described herein (e.g., demapper 1115, demapper 1215, demapper 1315, demapper 1420, demapper 1520) may perform similar demapping operations and thus may similarly combine repeated instances of one or more frequency domain signals. The frequency domain signals may then be input into inverse Fourier transformer 1525 to perform a frequency to time domain transform on the frequency domain signals to obtain sets of time domain symbols. These time domain symbols may have a phase ramp applied to them in the time domain (e.g., these time domain symbols may be phase-ramped). Based on whether or not the sets of time domain symbols have such a phase ramp applied, phase deramper 1530 may apply phase deramping (e.g., may apply an inverse phase ramp) to obtain the resulting bit stream 1250 according to a particular symbol constellation.

In the example of FIG. 15, the different waveforms are modulated according to a QPSK modulation scheme and a rotated QPSK modulation scheme. Demodulator 1535 accordingly applies a QPSK demodulation scheme and a rotated QPSK demodulation scheme to identify bit information for bits streams 1150 (e.g., hard-bit values, soft-bit values, LLRs, etc.) based on the respective sets of modulated symbols. However, in other examples, the different waveforms may be modulated according to different modulation schemes. For two or more streams, the phase rotation of the modulation schemes for the streams may depend on the number of streams and the modulation orders of the streams.

Figure 16:
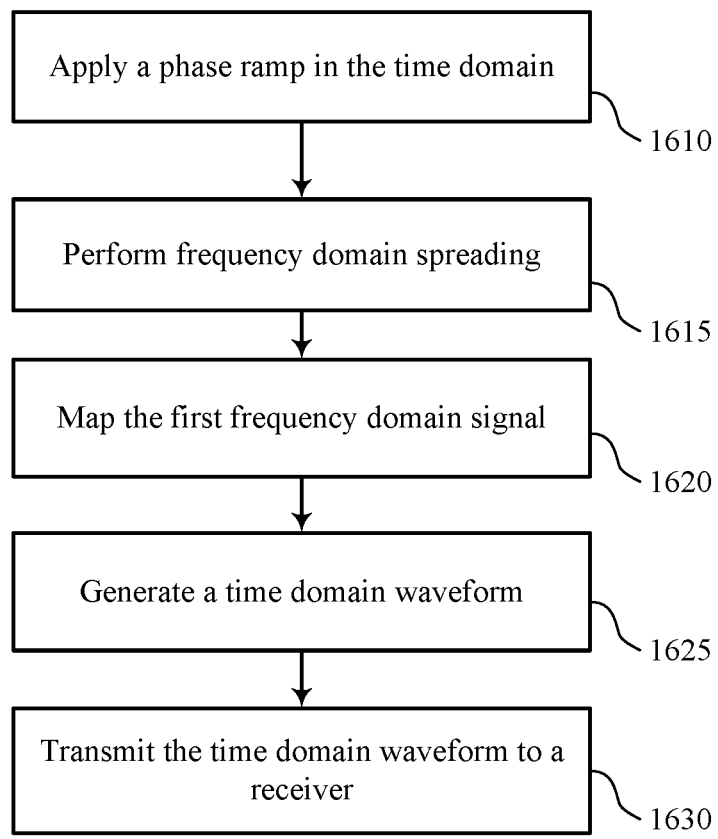
FIG. 16 shows a flowchart illustrating a method that supports time domain phase ramping for interlacing of multiple DFT spread waveforms in accordance with various aspects of the present disclosure.

FIG. 16 shows a flowchart illustrating a method 1600 that supports time domain phase ramping for interlacing of multiple DFT spread waveforms in accordance with various aspects of the present disclosure. The operations of method 1600 may be implemented by a UE 115 or its components as described herein. For example, the operations of method 1600 may be performed by a transmission stream processor as described with reference to FIGS. 3 through 8. Alternatively, and while the operations are described as performed by a UE 115, it should be understood that the operations of method 1600 may similarly be implemented by a transmitter at a base station 105 or its components as described herein. In some examples, a UE 115 may execute a set of codes to control the functional elements of the device to perform the functions described below. Additionally or alternatively, the UE 115 may perform aspects of the functions described below using special-purpose hardware.

At 1605 the UE 115 may apply a phase ramp in the time domain to the first set of symbols to obtain a set of phase-ramped time domain symbols, where the first set of symbols may be modulated according to a first symbol constellation for a transmission in a symbol period. The operations of 1605 may be performed according to the methods described herein. In certain examples, aspects of the operations of 1605 may be performed by a transmission stream processor as described with reference to FIGS. 3 through 8.

At 1610 the UE 115 may perform frequency domain spreading on the set of phase-ramped time domain symbols to obtain a first frequency domain signal. The operations of 1610 may be performed according to the methods described herein. In certain examples, aspects of the operations of 1610 may be performed by a transmission stream processor as described with reference to FIGS. 3 through 8.

At 1615 the UE 115 may map the first frequency domain signal to a first subset of a set of subcarriers for the transmission and a second frequency domain signal to a second subset of the set of subcarriers, wherein the second frequency domain signal is based at least in part on a second set of symbols modulated according to a second symbol constellation. The operations of 1615 may be performed according to the methods described herein. In certain examples, aspects of the operations of 1615 may be performed by a transmission stream processor as described with reference to FIGS. 3 through 8.

At 1620 the UE 115 may generate a time domain waveform for the transmission based on a frequency to time domain transform of the mapped first and second frequency domain signals to the set of subcarriers. The operations of 1620 may be performed according to the methods described herein. In certain examples, aspects of the operations of 1620 may be performed by a transmission stream processor as described with reference to FIGS. 3 through 8.

At 1625 the UE 115 may transmit the time domain waveform to a receiver. The operations of 1625 may be performed according to the methods described herein. In certain examples, aspects of the operations of 1625 may be performed by a transmission stream processor as described with reference to FIGS. 3 through 8.

Figure 17:
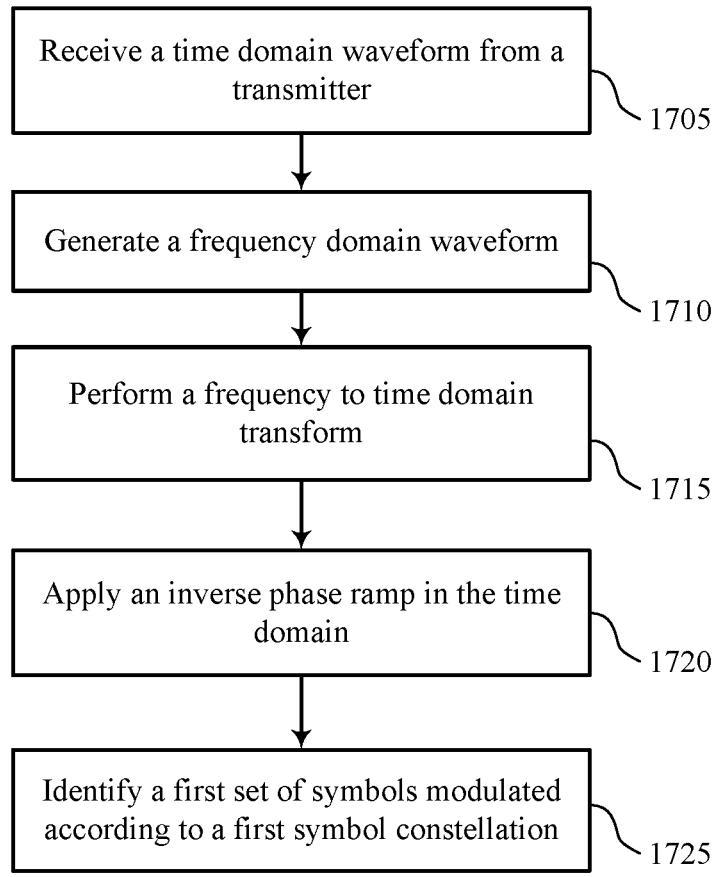
FIG. 17 shows a flowchart illustrating a method that supports time domain phase ramping for interlacing of multiple DFT spread waveforms in accordance with various aspects of the present disclosure.

FIG. 17 shows a flowchart illustrating a method 1700 that supports time domain phase ramping for interlacing of multiple DFT spread waveforms in accordance with various aspects of the present disclosure. The operations of method 1700 may be implemented by a base station 105 or its components as described herein. For example, the operations of method 1700 may be performed by a reception stream processor as described with reference to FIGS. 11 through 15. Alternatively, and while the operations are described as performed by a base station 105, it should be understood that the operations of method 1700 may similarly be implemented by a receiver at a UE 105 or its components as described herein. In some examples, a base station 105 may execute a set of codes to control the functional elements of the device to perform the functions described below. Additionally or alternatively, the base station 105 may perform aspects of the functions described below using special-purpose hardware.

At 1705 the base station 105 may receive a time domain waveform from a transmitter. The operations of 1705 may be performed according to the methods described herein. In certain examples, aspects of the operations of 1705 may be performed by a reception stream processor as described with reference to FIGS. 11 through 15.

At 1710 the base station 105 may generate a frequency domain waveform based on a time to frequency domain transform of the received time domain waveform to obtain a first frequency domain signal mapped to a first subset of a set of subcarriers and a second frequency domain signal mapped to a second subset of the set of subcarriers. The operations of 1710 may be performed according to the methods described herein. In certain examples, aspects of the operations of 1710 may be performed by a reception stream processor as described reference to FIGS. 11 through 15.

At 1715 the base station 105 may perform a frequency to time domain transform on the first frequency domain signal to obtain a first set of phase-ramped time domain symbols. The operations of 1715 may be performed according to the methods described herein. In certain examples, aspects of the operations of 1715 may be performed by a reception stream processor as described with reference to FIGS. 11 through 15.

At 1720 the base station 105 may apply an inverse phase ramp in the time domain to obtain a first set of time domain symbols. The operations of 1720 may be performed according to the methods described herein. In certain examples, aspects of the operations of 1720 may be performed by a reception stream processor as described reference to FIGS. 11 through 15.

At 1725 the base station 105 may identify, based on the first set of time domain symbols, a first set of symbols modulated according to a first symbol constellation. The operations of 1725 may be performed according to the methods described herein. In certain examples, aspects of the operations of 1725 may be performed by a reception stream processor as described reference to FIGS. 11 through 15.

In some examples, aspects from two or more of the methods may be combined. It should be noted that the methods are just example implementations, and that the operations of the methods may be rearranged or otherwise modified such that other implementations are possible.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein-including, for example, wireless communications system 100 and 200 as described with reference to FIGS. 1 and 2—may include one or more carriers, where each carrier may be a signal made up of multiple subcarriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C., as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
applying a phase ramp in a time domain to a first set of symbols to obtain a set of phase-ramped time domain symbols, the first set of symbols being modulated according to a first symbol constellation for a transmission in a symbol period;
performing frequency domain spreading on the set of phase-ramped time domain symbols to obtain a first frequency domain signal;
mapping the first frequency domain signal to a first subset of a set of subcarriers for the transmission and a second frequency domain signal to a second subset of the set of subcarriers, wherein the second frequency domain signal is based at least in part on a second set of symbols modulated according to a second symbol constellation;
generating a time domain waveform for the transmission based at least in part on a frequency to time domain transform of the mapped first and second frequency domain signals to the set of subcarriers; and
transmitting the time domain waveform to a receiver;
wherein the phase ramp for the first set of symbols is based at least in part on at least one of respective subcarrier mapping indexes for the mapping of the first frequency domain signal, a spreading length of the frequency domain spreading, a size of the frequency to time domain transform, or a combination thereof.

2. The method of claim 1, wherein the second symbol constellation is different from the first symbol constellation.

3. The method of claim 2, wherein the second symbol constellation corresponds to the first symbol constellation with a symbol rotation.

4. The method of claim 3, wherein the symbol rotation is based at least in part on a modulation order of the first symbol constellation.

5. The method of claim 2, wherein the second symbol constellation has a different modulation order than the first symbol constellation.

6. The method of claim 1, wherein the first symbol constellation and the second symbol constellation are a same symbol constellation.

7. The method of claim 1, wherein the phase ramp for the first set of symbols is based at least in part on the respective subcarrier mapping indexes for the mapping of the first frequency domain signal.

8. The method of claim 1, wherein the phase ramp for the first set of symbols is based at least in part on the spreading length of the frequency domain spreading.

9. The method of claim 1, wherein the phase ramp for the first set of symbols is based at least in part on the size of the frequency to time domain transform.

10. The method of claim 1, further comprising:
applying a second phase ramp in the time domain to the second set of symbols; and
performing frequency domain spreading of the phase-ramped second set of symbols to obtain the second frequency domain signal.

11. The method of claim 10, wherein the mapping comprises mapping a third frequency domain signal to a third subset of the set of subcarriers, and wherein the third frequency domain signal is based at least in part on a third set of symbols modulated according to a third symbol constellation.

12. The method of claim 11, further comprising:
applying a third phase ramp in the time domain to the third set of symbols; and
performing frequency domain spreading of the phase-ramped third set of symbols to obtain the third frequency domain signal.

13. The method of claim 1, wherein the first subset and the second subset of the set of subcarriers comprise interleaved subsets of the set of subcarriers.

14. The method of claim 1, wherein each symbol within the first symbol constellation has a corresponding symbol in the second symbol constellation, and wherein a translation from each symbol to the corresponding symbol does not cross a null symbol energy level.

15. The method of claim 1, wherein the first symbol constellation is a binary phase shift keyed constellation, a quadrature phase shift keyed constellation, or a quadrature amplitude modulation constellation.

16. The method of claim 1, wherein the first set of symbols comprise a first type of information and the second set of symbols comprise a second, different type of information.

17. The method of claim 1, wherein the second frequency domain signal comprises a frequency domain reference signal sequence.

18. An apparatus for wireless communication, in a system comprising:
a processor;
memory in electronic communication with the processor; and
instructions stored in the memory and executable by the processor to cause the apparatus to:
apply a phase ramp in a time domain to a first set of symbols to obtain a set of phase-ramped time domain symbols, the first set of symbols being modulated according to a first symbol constellation for a transmission in a symbol period;
perform frequency domain spreading on the set of phase-ramped time domain symbols to obtain a first frequency domain signal;
map the first frequency domain signal to a first subset of a set of subcarriers for the transmission and a second frequency domain signal to a second subset of the set of subcarriers, wherein the second frequency domain signal is based at least in part on a second set of symbols modulated according to a second symbol constellation;
generate a time domain waveform for the transmission based at least in part on a frequency to time domain transform of the mapped first and second frequency domain signals to the set of subcarriers; and
transmit the time domain waveform to a receiver; wherein the phase ramp for the first set of symbols is based at least in part on at least one of respective subcarrier mapping indexes for the mapping of the first frequency domain signal, a spreading length of the frequency domain spreading, a size of the frequency to time domain transform, or a combination thereof.

19. A method for wireless communication, comprising:
receiving a time domain waveform from a transmitter;
generating a frequency domain waveform based at least in part on a time to frequency domain transform of the received time domain waveform to obtain a first frequency domain signal mapped to a first subset of a set of subcarriers and a second frequency domain signal mapped to a second subset of the set of subcarriers;

performing a frequency to time domain transform on the first frequency domain signal to obtain a first set of phase-ramped time domain symbols, wherein the phase-ramped time domain symbols have a phase ramp that is based at least in part on at least one of respective subcarrier mapping indexes for a mapping of the first frequency domain signal, a spreading length of a frequency domain spreading associated with the first frequency domain signal, a size of the frequency to time domain transform, or a combination thereof;

applying an inverse phase ramp in the time domain to the first set of phase-ramped time domain symbols to obtain a first set of time domain symbols; and identifying, based at least in part on the first set of time domain symbols, a first set of symbols modulated according to a first symbol constellation.

20. The method of claim 19, further comprising identifying, based at least in part on the second frequency domain signal, a second set of symbols modulated according to a second symbol constellation.

21. The method of claim 20, wherein the second symbol constellation is different from the first symbol constellation.

22. The method of claim 21, wherein the second symbol constellation corresponds to the first symbol constellation with a symbol rotation.

23. The method of claim 21, wherein the symbol rotation is based at least in part on a modulation order of the first symbol constellation.

24. The method of claim 21, wherein the second symbol constellation has a different modulation order than the first symbol constellation.

25. The method of claim 20, wherein the first symbol constellation and the second symbol constellation are a same symbol constellation.

26. The method of claim 20, wherein each symbol within the first symbol constellation has a corresponding symbol in the second symbol constellation, and wherein a translation from each symbol to the corresponding symbol does not cross a null symbol energy level.

27. The method of claim 19, wherein the first set of symbols comprise a first type of information and the second set of symbols comprise a second, different type of information.

28. The method of claim 19, wherein the second frequency domain signal comprises a frequency domain reference signal sequence.

29. An apparatus for wireless communication, in a system comprising:

a processor;

memory in electronic communication with the processor; and instructions stored in the memory and executable by the processor to cause the apparatus to:

receive a time domain waveform from a transmitter;

generate a frequency domain waveform based at least in part on a time to frequency domain transform of the received time domain waveform to obtain a first frequency domain signal mapped to a first subset of a set of subcarriers and a second frequency domain signal mapped to a second subset of the set of subcarriers;

perform a frequency to time domain transform on the first frequency domain signal to obtain a first set of phase-ramped time domain symbols, wherein the phase-ramped time domain symbols have a phase ramp that is based at least in part on at least one of respective subcarrier mapping indexes for a mapping of the first frequency domain signal, a spreading length of a frequency domain spreading associated with the first frequency domain signal, a size of the frequency to time domain transform, or a combination thereof;

apply an inverse phase ramp in the time domain to the first set of phase-ramped time domain symbols to obtain a first set of time domain symbols; and identify, based at least in part on the first set of time domain symbols, a first set of symbols modulated according to a first symbol constellation.

* * * * *